(12) United States Patent
Chen et al.

(10) Patent No.: US 12,536,729 B2
(45) Date of Patent: Jan. 27, 2026

(54) TEXTURE TRANSFER AND SYNTHESIS USING ALIGNED MAPS IN IMAGE GENERATION SYSTEMS AND APPLICATIONS

(71) Applicant: Nvidia Corporation, Santa Clara, CA (US)

(72) Inventors: Zhiqin Chen, Burnaby (CA); Kangxue Yin, Toronto (CA); Sanja Fidler, Toronto (CA)

(73) Assignee: Nvidia Corporation, Santa Clara, CA (US)

(*) Notice: Subject to any disclaimer, the term of this patent is extended or adjusted under 35 U.S.C. 154(b) by 273 days.

(21) Appl. No.: 18/149,454

(22) Filed: Jan. 3, 2023

(65) Prior Publication Data
US 2023/0274492 A1    Aug. 31, 2023

Related U.S. Application Data

(60) Provisional application No. 63/314,914, filed on Feb. 28, 2022.

(51) Int. Cl.
*G06T 15/04* (2011.01)
*G06T 7/40* (2017.01)

(52) U.S. Cl.
CPC ............... *G06T 15/04* (2013.01); *G06T 7/40* (2013.01); *G06T 2207/10024* (2013.01); *G06T 2207/10028* (2013.01); *G06T 2207/20021* (2013.01); *G06T 2207/20084* (2013.01); *G06T 2210/56* (2013.01)

(58) Field of Classification Search
CPC . G06T 15/04; G06T 7/40; G06T 2207/10024; G06T 2207/10028; G06T 2207/20021; G06T 2207/20084; G06T 2210/56; G06T 17/00
See application file for complete search history.

(56) References Cited

U.S. PATENT DOCUMENTS

| | | | |
|---|---|---|---|
| 9,141,844 B2* | 9/2015 | Yalla | G06V 40/12 |
| 2009/0027412 A1* | 1/2009 | Burley | G06T 15/04 |
| | | | 345/582 |
| 2023/0050860 A1* | 2/2023 | Ilola | H04N 19/597 |

* cited by examiner

*Primary Examiner* — Said Broome
*Assistant Examiner* — Andrew Shin
(74) *Attorney, Agent, or Firm* — Hogan Lovells US LLP

(57) ABSTRACT

Approaches presented herein can utilize a network that learns to embed three-dimensional (3D) coordinates on a surface of one or more 3D shapes into an aligned two-dimensional (2D) texture space, where corresponding parts of different 3D shapes can be mapped to the same location in a texture image. Alignment can be performed using a texture alignment module that generates a set of basis images for synthesizing textures. A trained network can generate a basis shared by all shape textures, and can predict input-specific coefficients to construct the output texture for each shape as a linear combination of the basis images, then deform the texture to match the pose of the input. Such an approach can ensure alignment of textures, even in situations with at least somewhat limited network capacity. To unwrap shapes of complex structure or topology, a masking network can be utilized that cuts the shape into multiple pieces to reduce the distortion in the 2D mapping.

20 Claims, 18 Drawing Sheets

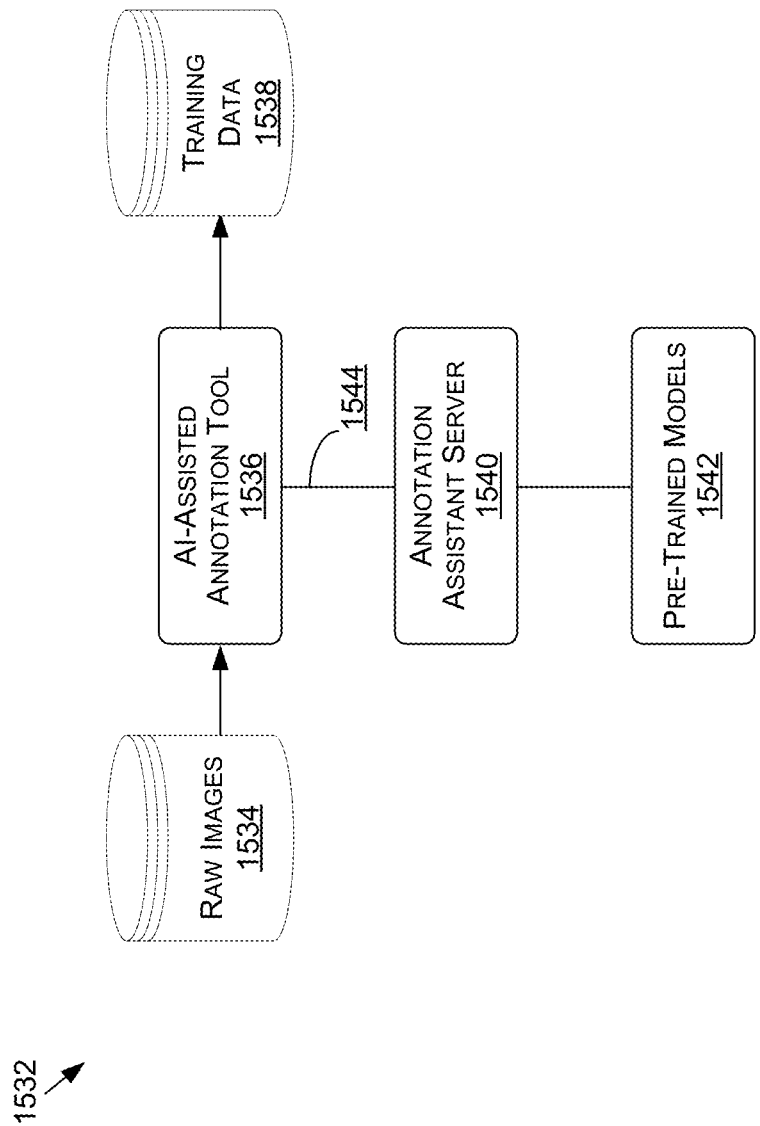

TEXTURE TRANSFER AND SYNTHESIS USING ALIGNED MAPS IN IMAGE GENERATION SYSTEMS AND APPLICATIONS

CROSS-REFERENCE TO RELATED APPLICATIONS

This application claims priority to U.S. Provisional Patent Application Ser. No. 63/314,914, filed Feb. 28, 2022, and entitled "Learning Aligned Maps for Texture Transfer and Synthesis," which is hereby incorporated by herein in its entirety and for all purposes.

BACKGROUND

Various applications utilize texture transfer and synthesis for three-dimensional (3D) models, such as to transfer textures for creating 3D human avatars, generating new textures for 3D models, and reconstructing a textured object from single image. Using the power of deep learning, 3D shapes can be reconstructed from voxels, point clouds, single and multi-view images, with a variety of output shape representations. 3D generative models have also been proposed to synthesize new shapes, with the aim of democratizing 3D content creation. However, despite the importance of textures in bringing 3D shapes to life, prior approaches do not account for semantic information in texture synthesis for 3D shapes. Previous work on texture generation mostly relies on warping a spherical mesh template to the target shape, therefore obtaining a texture map defined on the sphere's surface, which can be re-projected into a square image for the goal of texture synthesis. One example generates 3D shapes with a neural implicit representation for arbitrary surface topology, yet embeds the surface of the shape onto a sphere, which also results in a spherical texture map. Spherical texture maps can only support limited topology, and introduce severe distortions for thin parts such as animal limbs. Another line of work uses implicit texture fields for texture synthesis, without relying on explicit texture mapping. Although texture fields were successfully applied to multi-view image reconstruction, they have primarily been used for fitting a single object or scene. Generative models used for such purposes also usually suffer from overly smoothed output textures.

BRIEF DESCRIPTION OF THE DRAWINGS

Various embodiments in accordance with the present disclosure will be described with reference to the drawings, in which:

FIGS. 15A and 15B illustrate a data flow diagram for a process to train a machine learning model, as well as client-server architecture to enhance annotation tools with pre-trained annotation models, in accordance with at least one embodiment.

DETAILED DESCRIPTION

Figure 1:
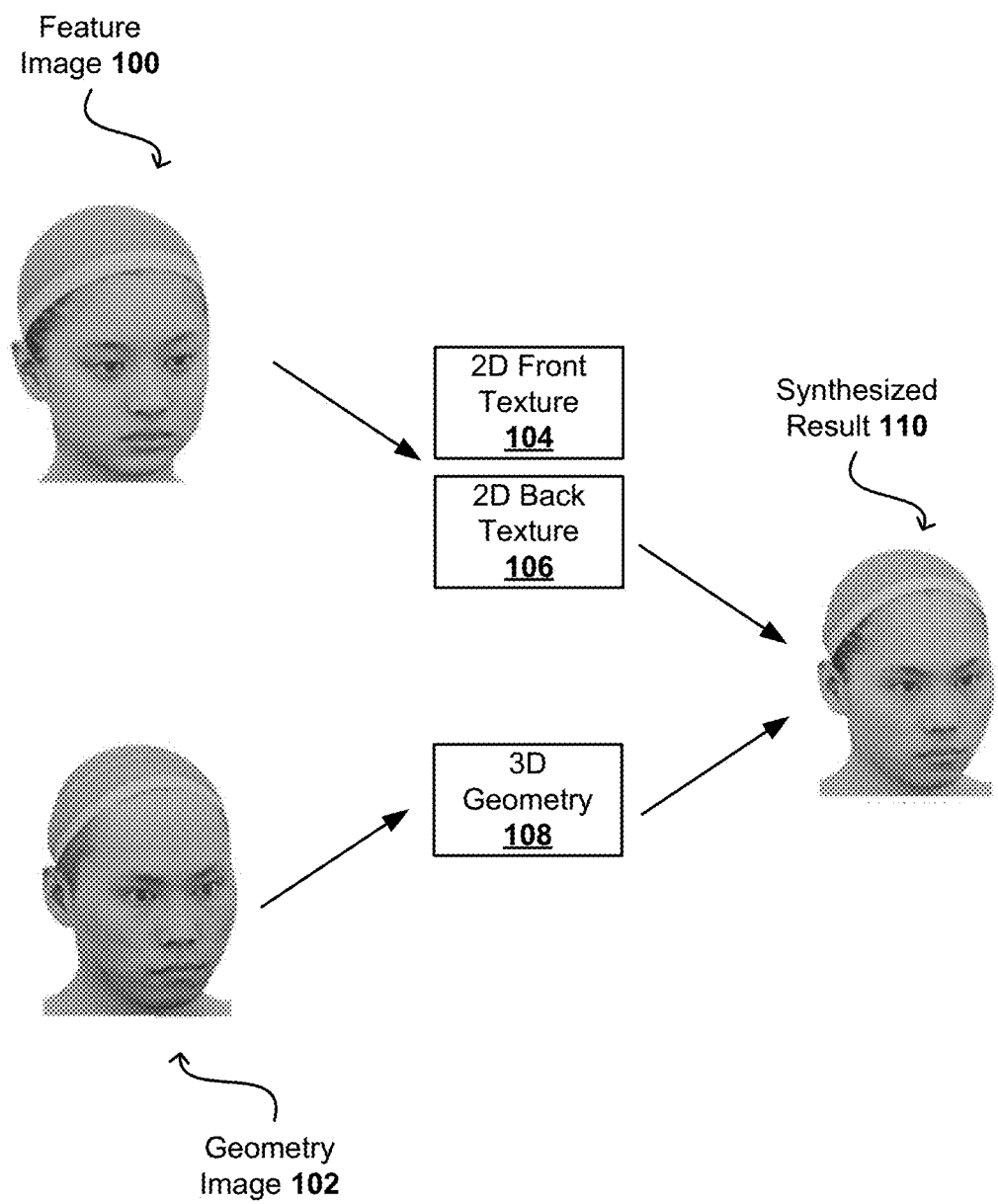
FIG. 1 illustrates synthesis of an object based upon visual features from a source image and geometric features from a source geometry, example textures that can be mapped to a set of meshes to synthesize unique characters, in accordance with various embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

The systems and methods described herein may be used by, without limitation, non-autonomous vehicles, semi-autonomous vehicles (e.g., in one or more advanced driver assistance systems (ADAS)), piloted and un-piloted robots or robotic platforms, warehouse vehicles, off-road vehicles, vehicles coupled to one or more trailers, flying vessels, boats, shuttles, emergency response vehicles, motorcycles, electric or motorized bicycles, aircraft, construction vehicles, trains, underwater craft, remotely operated vehicles such as drones, and/or other vehicle types. Further, the systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

Approaches in accordance with various illustrative embodiments provide for the synthesis of new digital content based, at least in part, upon aspects taken from two or more other instances of digital content. This can include using visual aspects (as well as potentially other aspects, such as semantic aspects) from at least one first object and geometric aspects (as well as potentially other aspects) from at least one other object to synthesize a new object, where other input may be used as well as may relate to style, pose, or motion, among other such options. In at least one embodiment, a trained machine learning model can take, as input, a three-dimensional 3D digital or virtual object and can generate one or more texture images (e.g., front and back texture images) that represent the texture (e.g., visual features) extracted from the object. A texture alignment module can be used to generate a set of basis images for synthesizing textures. A trained model can generate a basis shared by the shape textures, and can predict input-specific coefficients to construct the output texture for each shape as a linear combination of the basis images. The texture(s) can then be deformed to match the shape and/or pose of the input. Given limited network capacity, such an approach can force the textures to be aligned. To unwrap shapes of complex structure or topology, a masking network can be used that cuts the shape into multiple pieces, which can help to reduce the distortion in the UV mapping. A system implementing such an approach can be used to generate or synthesize new objects based on combining the shapes and poses of a first set of objects with the visual aspects of a second set of objects, where the first and second set may be part of the same set or even the same set in at least one embodiment.

In at least one embodiment, content synthesis can be used to generate new instances of content, such as new two-dimensional (2D) or three-dimensional (3D) views or representations of new objects, or objects that are based upon combinations of features or aspects of one or more other objects, or the same object in a different pose or state (e.g., a person having a shape of an adult rather than a child, or having changed shape through muscle gain or weight loss, among other such options). These generated or synthesized views or representations can be used for many different applications or use cases, such as for inclusion in video games, animation, virtual/augmented/enhanced reality applications, or environment simulation, as may be useful for training robotic, autonomous, or security systems. Such a synthesis process can be beneficial for a number of reasons. For example, such synthesis allows multiple instances of an object to be generated from a relatively small set of reference objects, where those instances can have different visual appearances. Further, such synthesis enables specific types of objects to be modified to have specific visual appearances or aspects without the need for an artist to manually perform any part of the generation process. Such a synthesis process can also provide a user with the ability to quickly modify the appearance of an object, or generate new objects, by changing the reference objects used in the process.

Variations of this and other such functionality can be used as well within the scope of the various embodiments as would be apparent to one of ordinary skill in the art in light of the teachings and suggestions contained herein.

FIG. 1 illustrates an example set of images that can be used or generated in such a synthesis process in accordance with at least one embodiment. In this example, a feature image 100 or representation can be selected of a first object that has one or more target visual features or aspects. In this example, this may include aspects such as skin tone, eye color, and hairline. A geometry image 102 can also be selected that corresponds to a second object (or the first object in a second pose or state) that has one or more target geometric aspects. In this example, this may include a shape of a head, including specific shapes for a nose, mouth, cheeks, and so on. The visual features of the feature image 100 can be used to generate one or more two-dimensional representations, such as a 2D front texture 104 and a 2D back texture 106 (or other first and second textures), where selection of which parts of the objects are represented by the front and back textures may be arbitrary, as long as the front and back textures represent a view around the object when combined. The front and back textures can include visual features extracted from, and mapped to, the source image. Geometric aspects of the geometry image 102 can be used to generate a 3D geometry 108, or 3D geometric representation (e.g., a mesh or point cloud) of the shape of the second object. Once obtained, the front texture 104 and the back texture 106 can be deformed according to the shape of the 3D geometry 108. When these deformed front and back textures are combined, the result is a 3D synthesized result 110 that is a representation of a new object, here a new head, that has the shape of the second object but the visual features of the first object. In this instance, the synthesized result has the shape of the head from the source geometry 102, but visual features from the head of the source image 100. In this way, the appearance of a new character (or other object) can be generated or modified through selection of the characters (or objects) selected for the appearance and geometry.

In at least one embodiment, one or more neural networks, or other machine learning models or algorithms, can be used to perform one or more of these steps. For example, a neural network can be trained and/or used to embed multi-dimensional (e.g., three-dimensional (3D)) coordinates on a surface of one or more multi-dimensional shapes into an aligned two dimensional (2D) space, such as a UV space where U and V denote axes of a texture (to differentiate from X, Y, and Z coordinates in model space). Prior approaches to texture representation for 3D shapes, in operations such as texture transfer and synthesis, applied spherical texture maps, which may lead to heavy distortion, or used continuous texture fields that yield smooth outputs lacking details. Alternatively, representing textures with images and linking them to a 3D mesh via a mapping approach such as UV, for example, may provide superior results. In at least one embodiment, an aligned UV network (referred to herein as an "AUV-Net")-based approach can be used which can learn to embed the 3D surface into a 2D aligned UV space, such by mapping the corresponding semantic parts of different 3D shapes to the same location in UV space. As a result, textures can be aligned across objects, and can be synthesized using generative models of images. Texture alignment can be learned in an unsupervised manner, and the learned UV mapping and aligned texture representations can allow for a variety of operations, including (without limitation) texture transfer, texture synthesis, and textured single view reconstruction.

Approaches in accordance with at least one embodiment take advantage of a mapping approach, such as UV mapping, that allows a system or process to handle arbitrary shape topology and avoid heavy distortion by cutting the surface into pieces and mapping different pieces to different regions on a plane, such as a UV plane. Such an approach can further preserve details by storing the textures in a high-resolution texture image on the UV plane. In at least one embodiment, a neural network can be trained to predict the UV mapping and the texture image jointly, resulting in high quality texture synthesis without needing to conform to a pre-defined shape topology. Learning texture mapping is not without challenges, however, as "ground truth" UV mappings provided by artists, or other such sources, are often in random layouts, missing correspondences between different shapes. Training a network on such data can lead to either underfitting due at least in part to the ambiguity, or may lead to overfitting due to the lack of training data.

Figure 2:
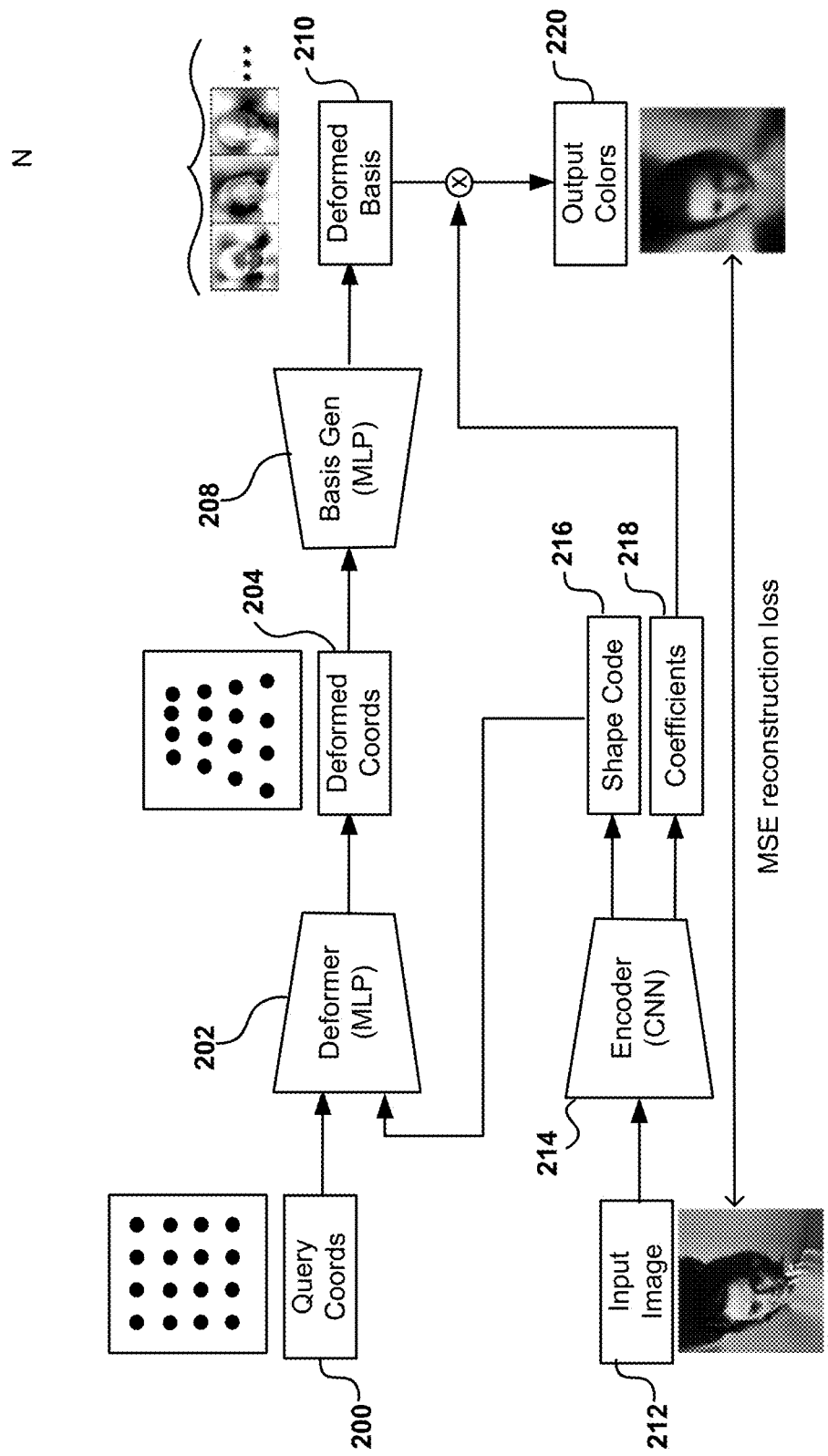
FIG. 2 illustrates an example network architecture that can be used for object alignment, in accordance with various embodiments.

In order to address such challenges, a network can learn to embed 3D coordinates into an aligned UV space, where corresponding parts of different 3D shapes are mapped to the same location in the texture image. Such alignment can be obtained using a texture alignment module. The network can generate a basis shared by all shape textures, and can predict input-specific coefficients to construct the output texture for each shape as a linear combination of the basis images, and then deforms the texture to match the pose of the input. Given a limited network capacity, this can force the textures to be aligned, as illustrated in FIG. 2. To unwrap shapes of complex structure or topology, a masking network can be used that cuts the shape into multiple pieces to reduce the distortion in the UV mapping. Such an approach can effectively align textures across all shapes, allowing textures to be swapped between different objects by simply replacing the texture image from one object with another. The aligned high-quality texture images produced using such an approach can make it significantly easier to train generative models of textures since they are aligned and disentangled from geometry. Such an approach also allows for textured 3D shape reconstruction from single images. These reconstructions have been demonstrated successfully for a variety of types of objects, such as human heads, human bodies, mammals, cars, and chairs, among others.

Learning aligned textures for a group of shapes can be a complex task, such as may typically require various heuristic assumptions and manually designed rules. It is possible, however to use a relatively simple alignment module for such operations that can generate strong results. FIG. 2 illustrates an example of an alignment module that can be used to align images, such as 2D images. The network architecture of the alignment model is illustrated with respect to a perspective-transformed face to demonstrate alignment performed by the module. In this example, an input image 212 can be provided to an encoder network 214, such as a convolutional neural network 214. The encoder 214 can extract features from the input image 212 and generate one or more encodings or embeddings, as may correspond to one or more vectors or points in a latent space. In this example, the encoder 214 can predict the coefficients 218 to use to weight the basis images in order to produce the output image, or determine the output colors 220 for pixels of the output image. The encoder 216 can also predict a shape code 216 from the input image 212 that can be used to condition a deformer 202 of the alignment module. The deformer 202 can take the form of a multilayer perceptron (MLP) that takes 2D point coordinates 200 concatenated with the shape code 216 as input and outputs a set of 2D deformed coordinates 204, which can be deformed based at least in part on the shape code 216 generated from the input image. The deformer 202 can deform the output of the generator, which is in a canonical pose, into the target pose. The deformed coordinates 204 can then be provided as input to a basis generator 208 that can then output a set of (deformed) basis images 210, A network selected as the basis generator 208 for images can use a multilayer perceptron (MLP) that takes a 2D point (x, y) as input and outputs the color of this point. For N basis images, the network can output N values (e.g., grayscale colors). One experiment set N=128, with an MLP being adopted for generating the basis at least because the MLP is fully differentiable with respect to both the colors of the basis and the input point coordinates. By way of contrast, if a network such as a convolutional neural network (CNN) were to be used to generate the basis, or a grid of learnable weights used to store the basis, a sampling may need to be performed from the output grid when given query points. Regardless of the sampling method used (e.g., bilinear or bicubic, among others), the gradients from the output color to the basis and the input point coordinates can be limited to a small region or neighborhood proximate the input point, which may prohibit the deformer 202 from receiving effective gradients. Once trained, a regular grid of query points can be input to the basis generator to obtain the basis images in a canonical pose and the aligned outputs. However, the input grid of query coordinates 200 may need to be warped with the deformer 202 at training time to deform the network output. Since the deformation should vary with different inputs in at least some embodiments, the shape code 216 can be used to condition the deformer.

Since inputs are images in at least one embodiment, a 2D CNN can be used as an encoder 214 to predict values such as shape code 216 and coefficients 218. The deformed basis 218 produced by the basis generator 208 can be multiplied with the coefficients 218 to produce the final output. A mean squared error (MSE), or other reconstruction value, can be calculated between the output image and the input image 212 as the loss. A prior loss may also be applied during an early stage of training (e.g., during the first few epochs), such as by applying an MSE between the query point coordinates 200 and the deformed coordinates 204, encouraging the deformer 202 to perform an identity mapping, so that the basis is initialized with appropriate orientation, scale, and position.

After training, an aligned basis and aligned outputs can be obtained if the basis generator is provided with the original non-deformed query points. Such an alignment model can align the inputs, as deforming the inputs into a canonical pose allows the basis generator to learn an effective basis decomposition, so that the reconstruction error can be reduced or even minimized. If the basis has to represent faces in different poses, this may result in a much larger reconstruction error. Although an aligned generator's outputs can be obtained, due to the nature of the process which decomposes a set of images into basis and then reconstruct them, the quality of the results can be far from that of the inputs, making them unusable. However, the deformer in an example network can learn to deform faces in a canonical pose to different poses in the inputs. Thus, the mapping is inverted then such a system can deform input faces into a canonical pose. An example MLP deformer may not be invertible, but the aligned input faces can be obtained by sampling enough points from the input image, feeding those points to the deformer to obtain deformed coordinates, using deformed coordinates and colors of the sampled points to fill a blank image, and inpainting the missing regions.

Figure 3A:
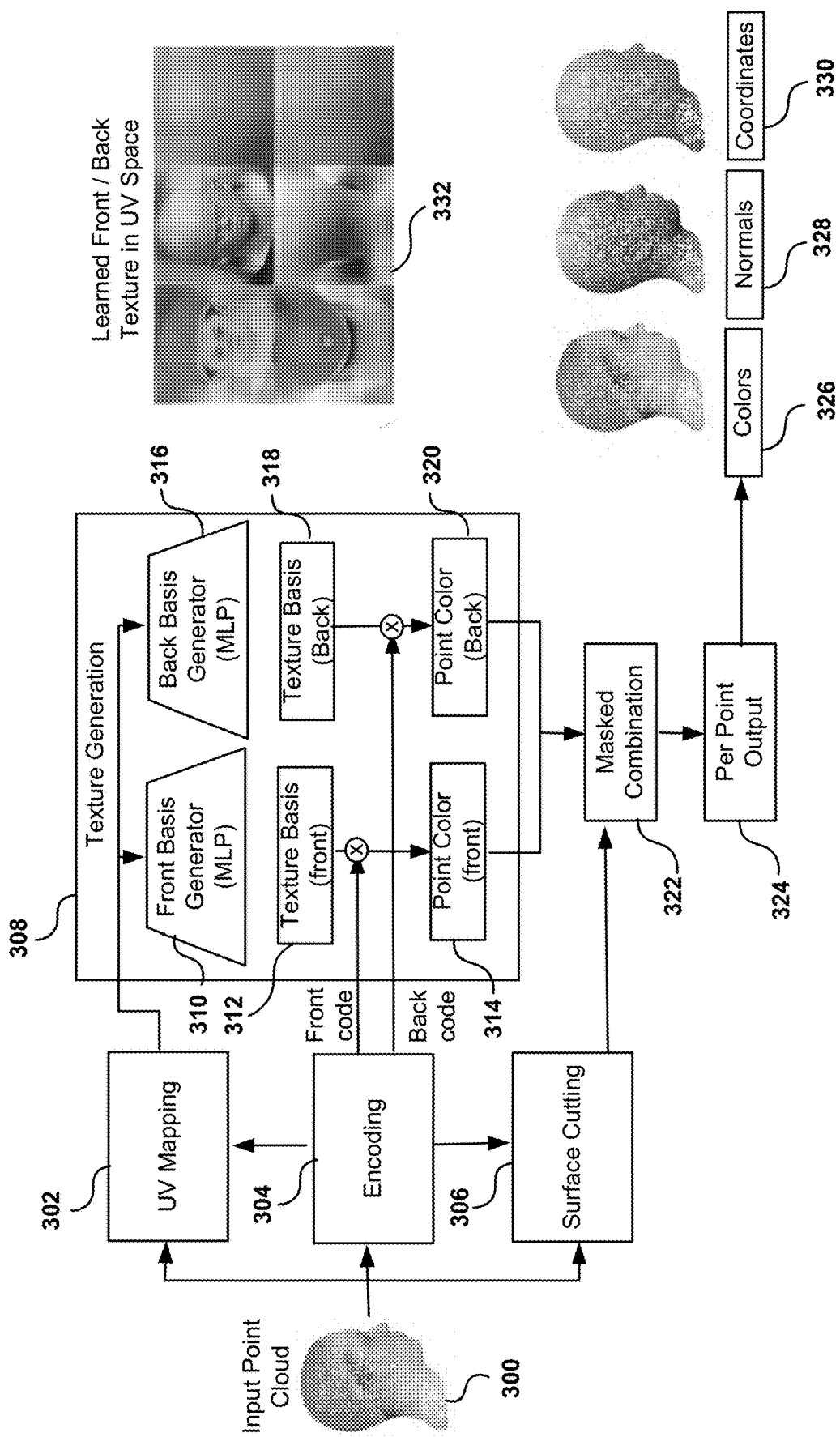
FIGS. 3A and 3B illustrate an example neural network architecture for textured mesh generation, in accordance with various embodiments.
Figure 3B:
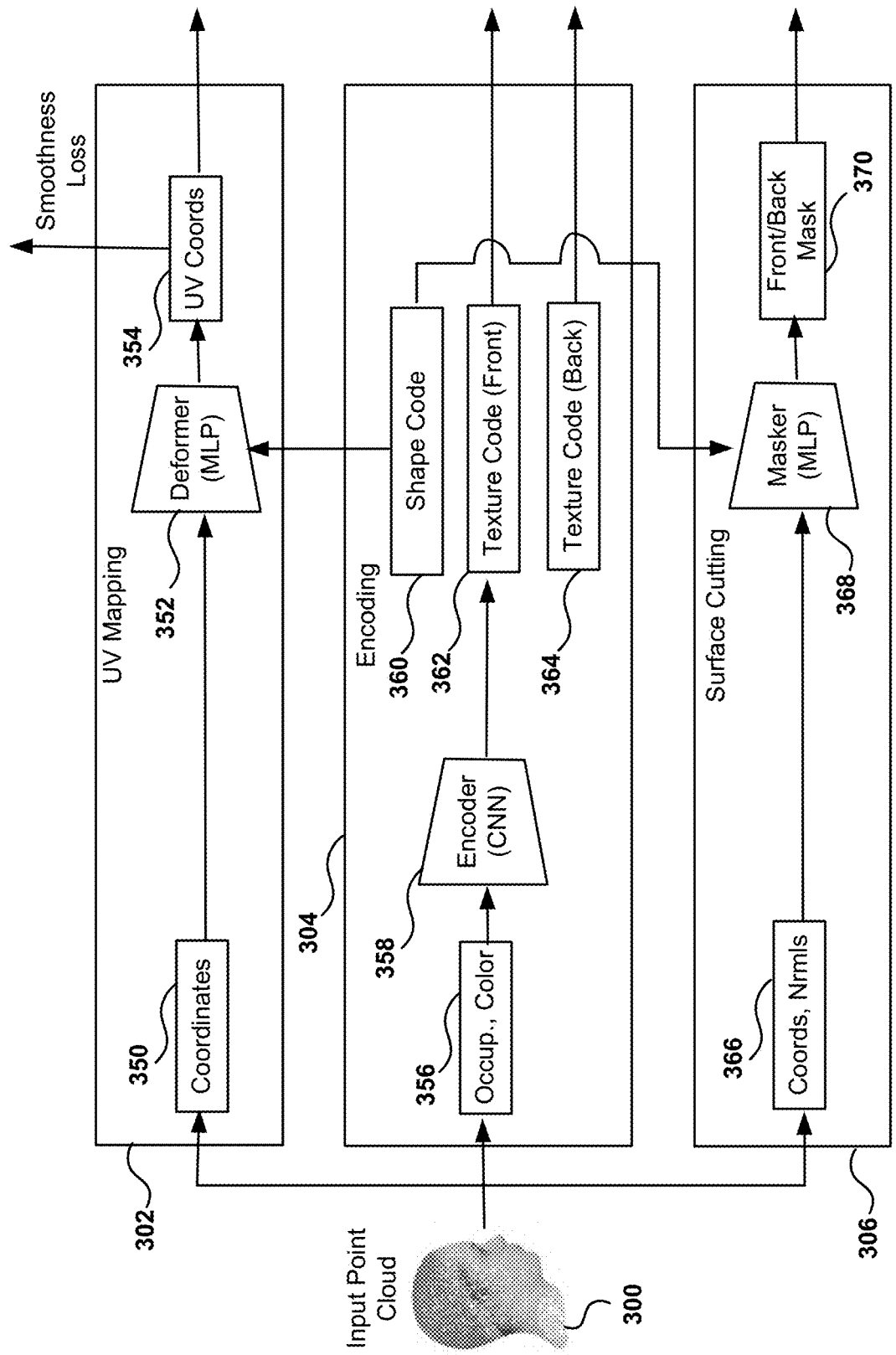

In at least one embodiment, a network for synthesizing 3D shapes can be built upon an alignment module, such as is illustrated in FIGS. 3A and 3B. An alignment model can be thought of as a network for learning aligned UV maps for textured 2D squares, where the deformer deforms the original points sampled from the square into an aligned UV space. A naive way to adapt to 3D shapes would be to replace the 2D CNN with a 3D CNN encoder, and adjust the deformer to take 3D points as inputs. Unlike a simple 2D-to-2D mapping, however, it can be difficult to embed a 3D shape into a 2D plane without overlap, cuts, and without severe distortion. Accordingly, a 3D shape can be cut into pieces and different images used to represent each piece. This can be equivalent to placing the pieces into the same texture image, while putting different pieces into different images can be more friendly to a basis generator.

Further, textures on 3D shapes tend to have large areas of pure colors or similar colors. Such tendencies may cause a deformer to "collapse." For example, if the input is a shape with pure white color then the deformer could simply map all input 3D points into the same 2D point, and the generator only needs to make that single 2D point white. On the other hand, if the input shape has multiple parts bearing the same color, it may be difficult for a network to distinguish and align different parts if the loss function is only defined on colors. In many instances 3D shapes will provide additional attributes, such that point normals and point 3D coordinates can be used to complement point color.

In the example network of FIG. 4 it is illustrated that, in addition to a color map 326, the alignment module can also output a normal map 328 and a coordinate map 330, for example, where the normal map 328 predicts the unit normals for input points, and the coordinate map 330 predicts the positions of the input 3D points. These additional maps 328, 330 can help to address one or more of the aforementioned issues. Further, a texture generation module 308 can include both a front basis generator 310 and a back basis generator 316, which can both be MLPs in this example. These basis generators can be used to represent the "front" and the "back" part of a shape, respectively, although the "front" does not literally denote the front-facing part of a shape, but instead refers to a portion of the shape so that the union of the "front" with the "back" covers the entire shape (or at least a relevant region of the shape). The two basis generators 310, 316 can output a front texture basis 312 and a back texture basis 318, using a process such as that discussed with respect to FIG. 2, with the head of the input cloud 300 being represented with two texture maps in this example. Different numbers of basis generators can be used in different embodiments or for different use cases, such as where four basis generators may be used for objects such as chairs that may have complex shapes, or where a higher level of detail may be required. As illustrated, an input 3D representation of an object, such as a point cloud representation of a head of a character, can be processed using modules, such as a UV mapping module 302, an encoding module 304, and a surface cutting module 306. As illustrated, the UV mapping module 302 and encoding module can provide input to the texture generation module 308, such as where the UV mapping data is provided to the front and back basis generators 310, 316 and the front and back encodings are used with the front and back texture bases 312, 318 to determine the front and back color data 314, 320, which can use the cut point data from the surface cutting module 306 to generate a masked combination 322 of point color data as per-point output 324, which can include the color data, normal data, and coordinate data used to generate the corresponding maps 326, 328, 330. An example set of images 332 shows example front and back textures learned in UV space, which represent the appearance features to be deformed according to a determined target geometry.

As illustrated in more detail in FIG. 3B, the UV mapping module 302 can take the coordinates 350 from the input point cloud as input to a deformer 352, which can generate the deformed coordinates 354 in UV space. The encoding module (missing shape code to deformer line) can take in (voxelized) occupancy and color data for input to an encoder 358, which can predict a shape code 360, front texture code 362, and back texture code 364 as discussed previously. The front and back texture codes can be provided for use with the texture bases in determining the front and back color data, while the shape code can be provided to the deformer 352 of the UV mapping module 302 for performing deformation and predicting the deformed UV coordinates 354.

The surface cutting module 306 can tack as input the coordinates and normals 366 from the input point cloud 300, and can provide these as input to a masker network 368, which can take the form of an MLP in this example. The masker network 368 can be used to generate a segmentation mask for the input point cloud 300. Such a process can be thought of as cutting the 3D shape into multiple pieces, represented in FIG. 3B as front and back masks 370, such that each of these pieces can be represented by a single texture image. The input to the masker contains the shape code 360 from the encoding module 304, in addition to the point coordinates and point normals 366. The normals can be important for segmenting the shapes, since thin parts such as fingers in a human body mesh can be difficult to segment with only point coordinates, as the points on the fingers may be clustered closely in space. The predicted segmentation mask(s) 370 can be used to mask the outputs of the front and back basis generators, as may be given by:

$$M \cdot A + (1-M) \cdot B$$

to produce the final output. It can be noted that a single shared deformer 352 can be used for both the front basis generator 310 and the back basis generator 316 in this example, instead of two independent deformers. One potential issue when transferring texture from one shape to another is that seams may be obtained between the shapes using two different texture images. A shared deformer 352 can alleviate this issue by forcing the two pieces to share the same boundary in the texture images, so that there is a trace of correspondences between the two texture images. After inpainting the texture images, the seams are then barely visible in most cases.

For training such a network, shapes can be converted into point clouds with normals and colors. The point clouds can also be converted into colored voxels as input to the 3D CNN encoder. A loss can be determined as a weighted sum of five terms, as may be given by:

$$L = w_c L_c + W_n L_n + W_x L_x + W_s L_s + W_p L_p$$

Here, $L_c$, $L_n$, and $L_x$ denote the color loss, normal loss, and cycle consistency loss on the coordinates, respectively.

These values can be defined as MSEs between the prediction and the ground truth. $L_s$ is the smoothness loss. For a subset of input points, their neighbors can be found within a σ=0.02 distance, and the distances between the points and their neighbors used to regularize the corresponding distances in the UV space, as may be given by:

$$L_s = \frac{1}{MN}\sum_{i=1}^{M}\sum_{j=1}^{N}|D(p_i, p_j) - D(q_i, q_j)| \cdot T(p_i, p_j)$$

where N is the number of input points, M is the size of the subset, $p_i$ is the $i^{th}$ input 3D point, $q_i$ is the $i^{th}$ 2D UV point deformed from $p_i$, and D(a, b) is the Euclidean distance between points a and b. Here, T(a, b) is defined as 1 if D(a, b)<σ and 0 otherwise. In each mini-batch, the shape can be processed with N=16,384 input points, and M=2,048. $L_p$ is the prior loss used to initialize the UV coordinates and the masks, which can vary per category of the training shapes. For a dataset where all objects are facing in the z direction, such as for the human head dataset shown in FIG. 4B, this can lead to:

$$L_p = \frac{1}{N}\sum_{i=1}^{N}(m_i - n_i)^2 + (p_i^x - q_i^x)^2 + (p_i^y - q_i^y)^2$$

Here, $m_i$ is the masking value predicted by the masker for the $i^{th}$ input point $p_i$. Value $n_i$ is defined as 1 if the normal of $p_i$ in the z direction is greater than −0.5, and 0 otherwise. Value $p_i^x$ is the x coordinate of $p_i$, $q_i^x$ is the x coordinate of the 2D UV point deformed from $p_i$. This equation can be sued to indicate that if the angle between a point's normal and z axis is less than 120 degrees, the point belongs to the "front" part. The z coordinates in the 3D input points can be removed to get the initial UV points. The prior loss is only used in the first few epochs of training to initialize the mask and the UV coordinates.

The network can be trained in stages, such as three stages, due at least in part to a trade-off between the quality of the texture alignment and the level of distortion. In some cases, aligning textures may involve requires heavy distortion in the texture image, such as when aligning a sedan with a van. In many instances, a reduced amount of distortion may be desirable as it can result in a reduced aliasing effect when rendering the textures, and can simplify post-processing. If a network is trained with fixed weighting of the loss terms, it has been observed that it can be difficult to obtain alignment with minimal distortion. To account for this in at least one embodiment, the network can first be initialized with prior loss $L_p$ and a set of weights that focus on minimal distortion. In a second (or intermediate) stage, $L_p$ can be removed and weights used that are focused on alignment. In a final stage, weights focused on minimal distortion can be used. For a human head dataset example, the first stage has 10 epochs, with {$w_c$, $w_n$, $w_x$, $w_s$, $w_p$}={1, 0.5, 100, 100, 1}; second stage has 2,000 epochs, with {1, 0.5, 1, 1, 0}; third stage has 2,000 epochs, with {1, 0.5, 100, 100, 0}.

Figure 4A:
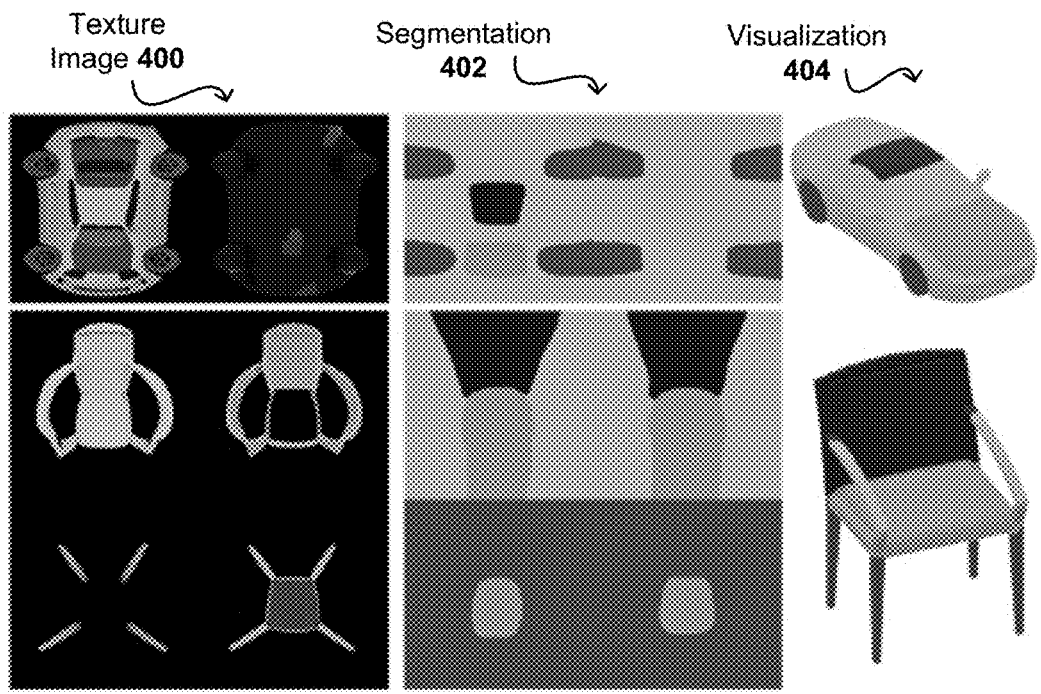
FIGS. 4A and 4B illustrate example texture images, segmentations, and textured meshes, in accordance with various embodiments.
Figure 4B:
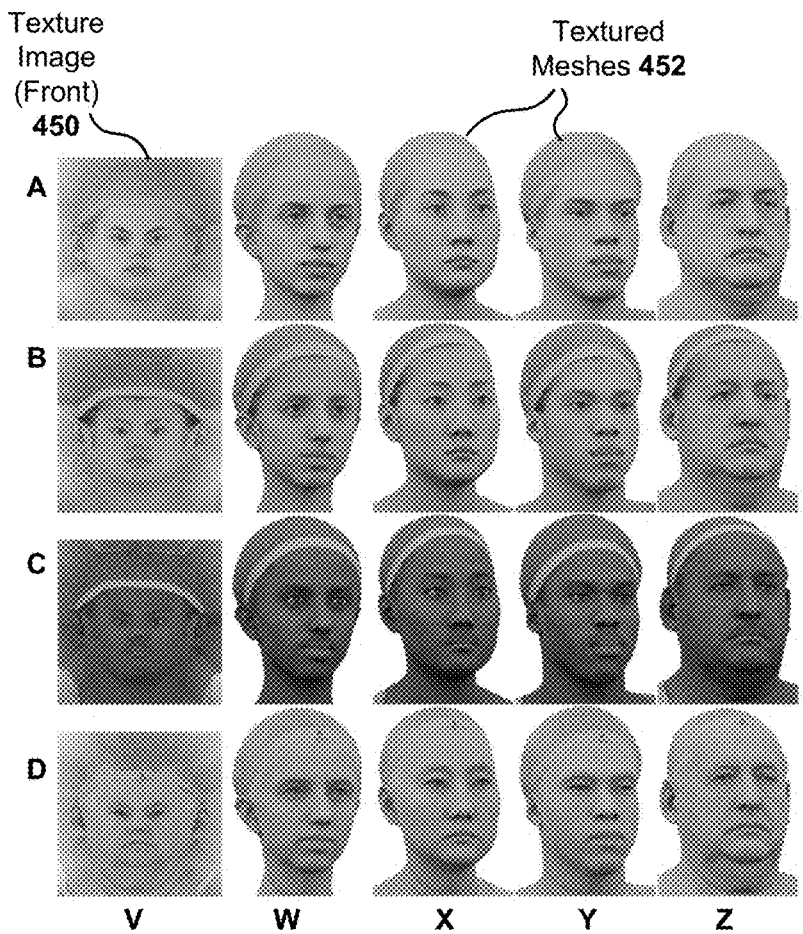

There can be various applications or operations that can take advantage of systems and methods in accordance with various embodiments. One such operation relates to texture transfer. Aligned, high-quality texture images can be obtained after training an AUV-Net, as shown in FIG. 4B. Textures can then be swapped between two training shapes by swapping their texture images, producing new 3D content by hybridizing existing geometries and textures. If there is a new shape that is not in the training set, that shape can be textured by mapping its vertices into an aligned UV space. This can be performed using a post-training optimization stage, in which the new shape is added into the training set, and training the network continues for a few epochs. During the optimization, the weights of the basis generators can be fixed to avoid affecting the already well-trained training shapes. After optimization, UV coordinates of the new shape can be obtained, as well as its texture.

An advantage to having aligned texture images is that 2D generative models can be used to synthesize new textures for 3D shapes. An existing 2D generative model can be trained on the aligned high-quality texture images. Texture synthesize can also be conditioned on a variety of inputs, such as for reconstructing textured 3D shapes from single images. To this end, 2D residual network (ResNet) image encoder can be used to predict the texture latent code and the shape code from an input image, a CNN decoder can be used to predict the texture images from the texture latent code, and an IM-Net decoder can be used to predict the geometry of the shape conditioned on the shape code. FIG. 4A illustrates sample texture images 400 and segmentations 402 that can be generated for two types of items, in this instance a car and a chair as illustrated in the corresponding visualizations 404. The texture images 400 are illustrated before inpainting, and there are two texture images for the car and four texture images for the chair. FIG. 4B, on the other hand, illustrates a set of texture images 450 for a set of objects A, B, C, D (in this example front texture images) that can be deformed to generate textured meshes 452 that correspond to the geometries of four other people W, X, Y, Z. As can be seen, features can be taken from four people and geometries taken from another four people to generate a set of 16 unique people, where each of these unique people has the facial feature or aspects of one person and the geometric shape of another person. As mentioned, a generative method as presented herein can use cues such as colors, normals, and positions when finding correspondences, and can then performs well on aligning various features, such as facial orifices, car windows and wheels, fingers, and animal limbs. It has been observed that colors can be very beneficial for aligning at least certain types of textures.

Figure 5:
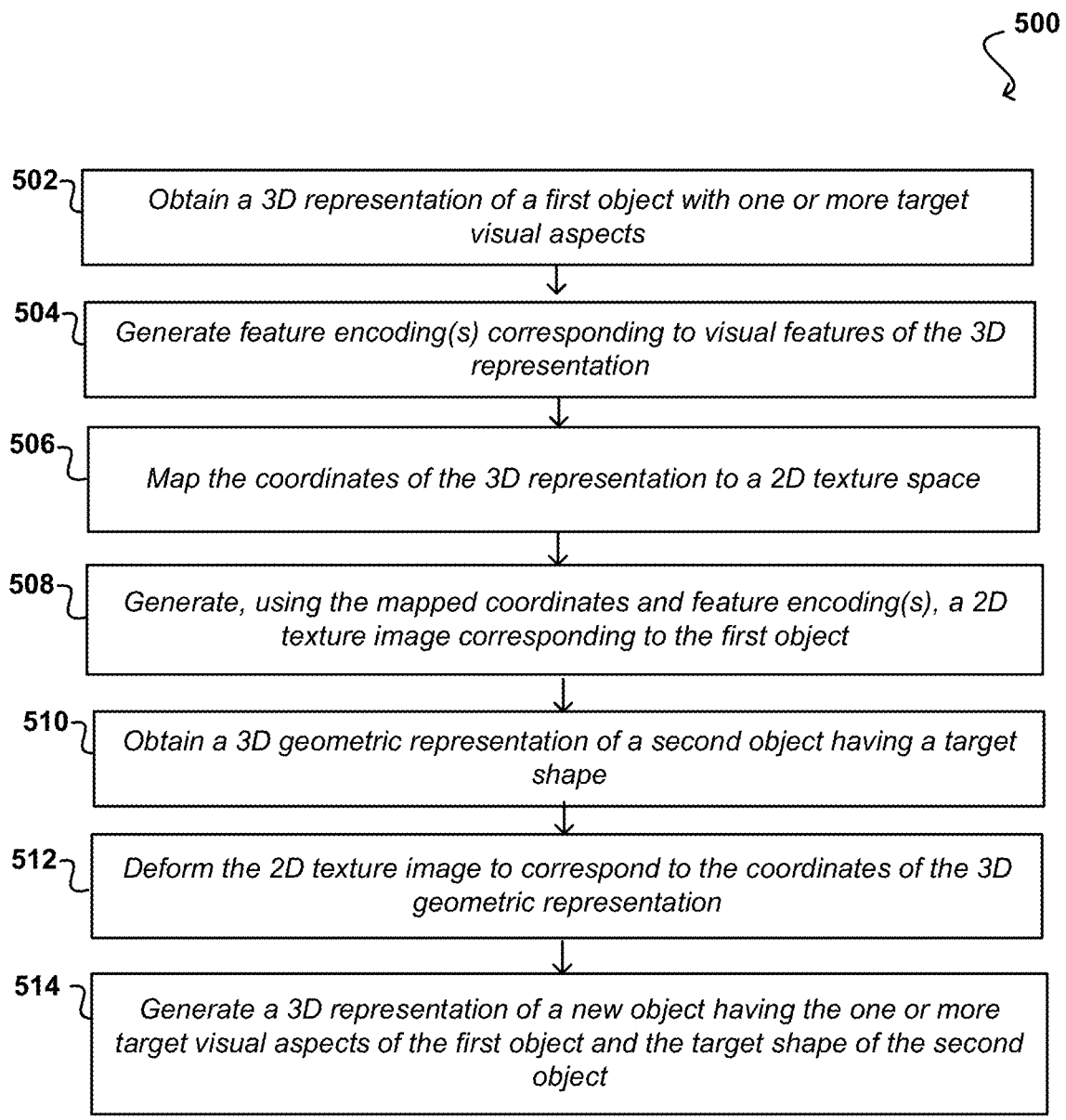
FIG. 5 illustrates an example process for generating a three-dimensional representation of a new object, in accordance with various embodiments.

FIG. 5 illustrates an example process 500 for generating a representation of a new object that can be performed in accordance with at least one embodiment. It should be understood that for this and other processes presented herein that there may be additional, fewer, or alternative steps performed or similar or alternative orders, or at least partially in parallel, within the scope of the various embodiments unless otherwise specifically stated. Further, although this example is described with respect to generating 3D representations based on representations of two objects, different dimensionalities and numbers of objects having aspects to be combined can be used as well within the scope of various embodiments. In this example, a 3D representation of a first object is obtained 502, where that first object has one or more target visual aspects that are to appear on a synthesized object. One or more feature encodings can be generated 504 corresponding to visual features of the 3D representation, where this might include a front encoding and back a encoding, among other such options, where each encoding may correspond to a feature vector or point in a latent feature space. The coordinates of the 3D representation can be mapped 506 to a 2D texture space. These coordinate mappings and feature encoding(s) can be used to generate 508 a 2D texture image that corresponds to the first object and includes data values for at least some of the extracted features. For a front texture image, the texture image can include data values for features visible from a single point of view (e.g., the entire front of the object), and a back texture image can include data values visible from an opposite point of view, such that the pair of front and back texture images include data values representing a 360 degree view of the first object.

In addition to generating a 2D texture image for a first object, a geometric representation of a second object can be obtained 510, where the second object can have a target shape that is to be used in synthesizing a new object. In some embodiments, such as where the obtained representation is a 3D model of an object, a point cloud or mesh representation can be generated that represents the shape of the second object but is free of any other visual features or aspects, such as color or texture. The 2D texture image(s) can be deformed 512 to correspond to the coordinates of the 3D geometric representation. This can effectively project or wrap the texture images onto the shape of the 3D geometric representation, such that the visual features of the texture image(s) are placed at appropriate locations on the shape of the geometric representation, such as where the visual features of a first person can be deformed to correspond to the facial or body shape of a second person. A 3D representation of a new object can then be generated 514 that has the target visual aspects of the first object and the target shape of the second object. This 3D representation can then be used for various applications or operations, such as for 3D animation in a virtual reality experience or robot simulation environment, or for 2D renderings of the 3D object in a video game or movie, among other such options.

As mentioned, such an approach can utilize the power of deep learning, 3D shapes can be reconstructed from voxels, point clouds, single and multi-view images, as examples, with a variety of output shape representations. The ability for 3D generative models to be used to synthesize new shapes can allow for the democratizing of 3D content creation. Despite the importance of textures in bringing 3D shapes to life, prior approaches typically do not allow for semantic-aware texture synthesis for 3D shapes. Previous work on texture generation mostly relies on warping a spherical mesh template to the target shape, obtaining a texture map defined on the surface of the sphere, which can be re-projected into a square image for texture synthesis. One prior approach generated 3D shapes with a neural implicit representation for arbitrary surface topology, yet embedded the surface of the shape into a sphere, which also results in a spherical texture map. Spherical texture maps can only support limited topology, and introduce severe distortions for thin parts such as animal limbs. Another line of work uses implicit texture fields for texture synthesis; without relying on explicit texture mapping. Although texture fields were successfully applied to multi-view image reconstruction, they have primarily been used for fitting a single object or scene. Generative models usually suffer from overly smoothed output textures.

One category of prior approaches relates to template-based methods. These methods assume that all target shapes can be represented by deforming a template mesh, usually a sphere or sometimes a plane. The UV map of the template mesh is given and transferred to the target shape after deformation. However, by imposing a mesh template, these methods often cannot capture details, especially when the topology or structure of the target shape is complex. For example, when deforming a sphere into a human body, it is hard to accurately reconstruct the fingers. Even if deformation is successful, the texture of the fingers—when projected from the human body to a sphere and then to its texture image—is typically heavily distorted.

Another line of work does not assume that a template mesh is given, but instead assumes that the UV maps are provided with the input 3D shapes. UV maps and textures are usually modeled by artists and can be in arbitrary layouts. To address this issue, these methods usually require ground-truth semantic segmentation of the texture image or the 3D shape for semantic-aware texture synthesis. In our work, we aim to perform texture synthesis without such supervision. Another category of prior work relates to texture discretizing. Instead of adopting UV maps to reduce the dimensionality of textures from 3D to 2D, some methods discretize the 3D shapes into "atoms" and then colorize each "atom". When the shape representation is a voxel grid, the shape can be textured by predicting the color of each voxel. For triangle meshes, the color of each vertex can be predicted. However, since discretization is in 3D rather than in 2D (pixels), these approaches either cannot scale up, or cannot predict the color efficiently due to irregularity of the representation.

Other prior work focuses on texture fields, which predicts the color for each 3D point in a continuous 3D space. The NeRF family also adopts this approach, by using the viewing direction as an additional condition for predicting the color for each point. A significant issue of a texture fields approach is that it is unable to represent high-frequency details, which is a property of the MLPs that it uses. Positional encoding and SIREN are proposed to alleviate the issue of the 3D implicit field, which works well on overfitting of single shapes. However, performance degrades significantly in generative tasks. The results of implicit methods tend to be smooth and lack high-frequency details. Yet another category of prior work relates to dense correspondences. There is a large body of work that finds dense correspondences among shapes, which can also enable texture transfer. However, these methods do not take color into account during registration, which may hinder performance for our target application.

Prior template-based methods assume that all target shapes can be represented by deforming a template mesh, such as a sphere or sometimes plane. The UV map of the template mesh is given and transferred to the target shape after deformation. However, by imposing a mesh template, these methods often cannot capture details, especially when the topology or structure of the target shape is complex. For example, when deforming a sphere into a human body, it has been observed that it can be difficult to accurately reconstruct the fingers. Even if deformation is successful, the texture of the fingers—when projected from the human body to a sphere and then to its texture image—is often heavily distorted. Another line of work does not assume that a template mesh is given, but instead assumes that the UV maps are provided with the input 3D shapes. UV maps and textures are often modeled by artists and can be in arbitrary layouts. To address this issue, these methods usually require ground-truth semantic segmentation of the texture image or the 3D shape for semantic-aware texture synthesis. Approaches in accordance with various embodiments presented herein can perform texture synthesis without such supervision.

As discussed, aspects of various approaches presented herein can be lightweight enough to execute on a device such as a client device, such as a personal computer or gaming console, in real time. Such processing can be performed on content (e.g., a rendered version of a unique asset) that is generated on, or received by, that client device or received from an external source, such as streaming data or other content received over at least one network. In some instances, the processing and/or determination of this content may be performed by one of these other devices, systems, or entities, then provided to the client device (or another such recipient) for presentation or another such use.

Figure 6:
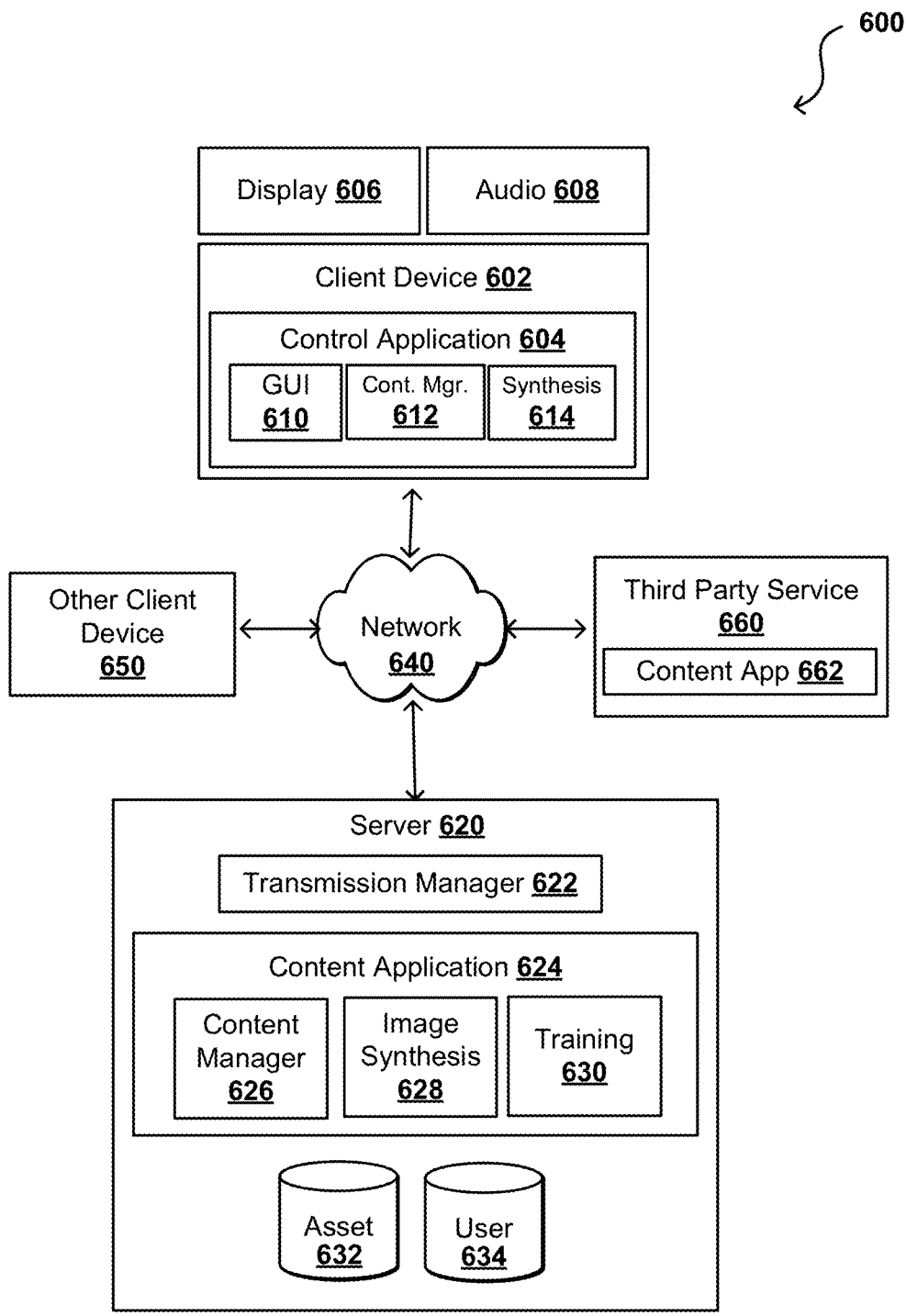
FIG. 6 illustrates components of a distributed system that can be utilized to train or perform inferencing using a generative model, according to at least one embodiment.

As an example, FIG. 6 illustrates an example network configuration 600 that can be used to provide, generate, modify, encode, process, and/or transmit image data or other such content. In at least one embodiment, a client device 602 can generate or receive data for a session using components of a content application 604 on client device 602 and data stored locally on that client device. In at least one embodiment, a content application 624 executing on a server 620 (e.g., a cloud server or edge server) may initiate a session associated with at least one client device 602, as may utilize a session manager and user data stored in a user database 634, and can cause content such as one or more digital assets (e.g., object representations) from an asset repository 632 to be determined by a content manager 626. A content manager 626 may work with an image synthesis module 628 to generate or synthesize new objects (or digital assets) by combining shapes and visual aspects or features of two or more other objects, as described herein, or other such content to be provided for presentation via the client device 602. In at least one embodiment, this image synthesis module 628 can use one or more neural networks, or machine learning models, which can be trained using a training module 630 or system that is on, or in communication with, the server 620. At least a portion of the generated or enhanced audio data or content may be transmitted to the client device 602 using an appropriate transmission manager 622 to send by download, streaming, or another such transmission channel. An encoder may be used to encode and/or compress at least some of this data before transmitting to the client device 602. In at least one embodiment, the client device 602 receiving such content can provide this content to a corresponding content application 604, which may also or alternatively include a graphical user interface 610, content manager 612, and image synthesis module 614 for use in providing, synthesizing, modifying, or using content for presentation (or other purposes) on or by the client device 602. A decoder may also be used to decode data received over the network(s) 640 for presentation via client device 602, such as image or video content through a display 606 and audio, such as sounds and music, through at least one audio playback device 608, such as speakers or headphones. In at least one embodiment, at least some of this content may already be stored on, rendered on, or accessible to client device 602 such that transmission over network 640 is not required for at least that portion of content, such as where that content may have been previously downloaded or stored locally on a hard drive or optical disk. In at least one embodiment, a transmission mechanism such as data streaming can be used to transfer this content from server 620, or user database 634, to client device 602. In at least one embodiment, at least a portion of this content can be obtained, enhanced, and/or streamed from another source, such as a third party service 660 or other client device 650, that may also include a content application 662 for generating, enhancing, or providing content. In at least one embodiment, portions of this functionality can be performed using multiple computing devices, or multiple processors within one or more computing devices, such as may include a combination of CPUs and GPUs.

In this example, these client devices can include any appropriate computing devices, as may include a desktop computer, notebook computer, set-top box, streaming device, gaming console, smartphone, tablet computer, VR headset, AR goggles, wearable computer, or a smart television. Each client device can submit a request across at least one wired or wireless network, as may include the Internet, an Ethernet, a local area network (LAN), or a cellular network, among other such options. In this example, these requests can be submitted to an address associated with a cloud provider, who may operate or control one or more electronic resources in a cloud provider environment, such as may include a data center or server farm. In at least one embodiment, the request may be received or processed by at least one edge server, that sits on a network edge and is outside at least one security layer associated with the cloud provider environment. In this way, latency can be reduced by enabling the client devices to interact with servers that are in closer proximity, while also improving security of resources in the cloud provider environment.

In at least one embodiment, such a system can be used for performing graphical rendering operations. In other embodiments, such a system can be used for other purposes, such as for providing image or video content to test or validate autonomous machine applications, or for performing deep learning operations. In at least one embodiment, such a system can be implemented using an edge device, or may incorporate one or more Virtual Machines (VMs). In at least one embodiment, such a system can be implemented at least partially in a data center or at least partially using cloud computing resources.

Inference and Training Logic

Figure 7A:
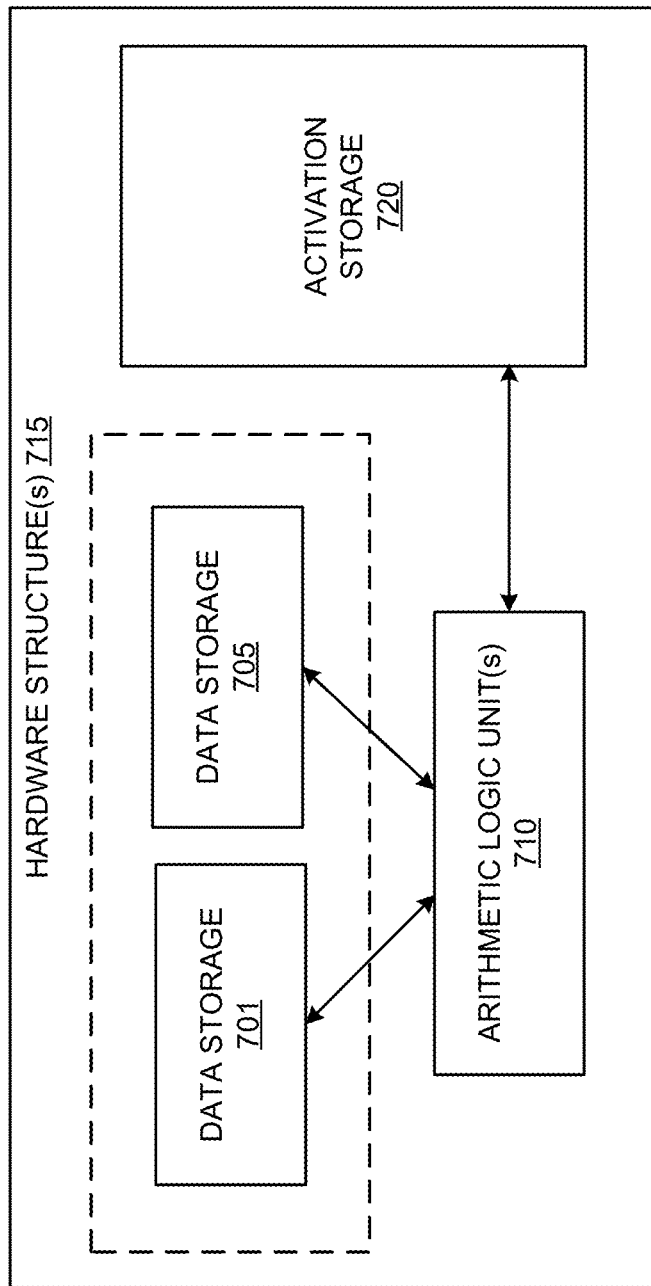
FIG. 7A illustrates inference and/or training logic, according to at least one embodiment.

FIG. 7A illustrates inference and/or training logic 715 used to perform inferencing and/or training operations associated with one or more embodiments. Details regarding inference and/or training logic 715 are provided below in conjunction with FIGS. 7A and/or 7B.

In at least one embodiment, inference and/or training logic 715 may include, without limitation, code and/or data storage 701 to store forward and/or output weight and/or input/output data, and/or other parameters to configure neurons or layers of a neural network trained and/or used for inferencing in aspects of one or more embodiments. In at least one embodiment, training logic 715 may include, or be coupled to code and/or data storage 701 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, code and/or data storage 701 stores weight parameters and/or input/output data of each layer of a neural network trained or used in conjunction with one or more embodiments during forward propagation of input/output data and/or weight parameters during training and/or inferencing using aspects of one or more embodiments. In at least one embodiment, any portion of code and/or data storage 701 may be included with other on-chip or off-chip data storage, including a processor's L1, L2, or L3 cache or system memory.

In at least one embodiment, any portion of code and/or data storage 701 may be internal or external to one or more processors or other hardware logic devices or circuits. In at least one embodiment, code and/or code and/or data storage 701 may be cache memory, dynamic randomly addressable memory ("DRAM"), static randomly addressable memory ("SRAM"), non-volatile memory (e.g., Flash memory), or other storage. In at least one embodiment, choice of whether code and/or code and/or data storage 701 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, inference and/or training logic 715 may include, without limitation, a code and/or data storage 705 to store backward and/or output weight and/or input/output data corresponding to neurons or layers of a neural network trained and/or used for inferencing in aspects of one or more embodiments. In at least one embodiment, code and/or data storage 705 stores weight parameters and/or input/output data of each layer of a neural network trained or used in conjunction with one or more embodiments during backward propagation of input/output data and/or weight parameters during training and/or inferencing using aspects of one or more embodiments. In at least one embodiment, training logic 715 may include, or be coupled to code and/or data storage 705 to store graph code or other software to control timing and/or order, in which weight and/or other parameter information is to be loaded to configure, logic, including integer and/or floating point units (collectively, arithmetic logic units (ALUs). In at least one embodiment, code, such as graph code, loads weight or other parameter information into processor ALUs based on an architecture of a neural network to which the code corresponds. In at least one embodiment, any portion of code and/or data storage 705 may be included with other on-chip or off-chip data storage, including a processor's L1, L2, or L3 cache or system memory. In at least one embodiment, any portion of code and/or data storage 705 may be internal or external to on one or more processors or other hardware logic devices or circuits. In at least one embodiment, code and/or data storage 705 may be cache memory, DRAM, SRAM, non-volatile memory (e.g., Flash memory), or other storage. In at least one embodiment, choice of whether code and/or data storage 705 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors.

In at least one embodiment, code and/or data storage 701 and code and/or data storage 705 may be separate storage structures. In at least one embodiment, code and/or data storage 701 and code and/or data storage 705 may be same storage structure. In at least one embodiment, code and/or data storage 701 and code and/or data storage 705 may be partially same storage structure and partially separate storage structures. In at least one embodiment, any portion of code and/or data storage 701 and code and/or data storage 705 may be included with other on-chip or off-chip data storage, including a processor's L1, L2, or L3 cache or system memory.

In at least one embodiment, inference and/or training logic 715 may include, without limitation, one or more arithmetic logic unit(s) ("ALU(s)") 710, including integer and/or floating point units, to perform logical and/or mathematical operations based, at least in part on, or indicated by, training and/or inference code (e.g., graph code), a result of which may produce activations (e.g., output values from layers or neurons within a neural network) stored in an activation storage 720 that are functions of input/output and/or weight parameter data stored in code and/or data storage 701 and/or code and/or data storage 705. In at least one embodiment, activations stored in activation storage 720 are generated according to linear algebraic and or matrix-based mathematics performed by ALU(s) 710 in response to performing instructions or other code, wherein weight values stored in code and/or data storage 705 and/or code and/or data storage 701 are used as operands along with other values, such as bias values, gradient information, momentum values, or other parameters or hyperparameters, any or all of which may be stored in code and/or data storage 705 or code and/or data storage 701 or another storage on or off-chip.

In at least one embodiment, ALU(s) 710 are included within one or more processors or other hardware logic devices or circuits, whereas in another embodiment, ALU(s) 710 may be external to a processor or other hardware logic device or circuit that uses them (e.g., a co-processor). In at least one embodiment, ALUs 710 may be included within a processor's execution units or otherwise within a bank of ALUs accessible by a processor's execution units either within same processor or distributed between different processors of different types (e.g., central processing units, graphics processing units, fixed function units, etc.). In at least one embodiment, code and/or data storage 701, code and/or data storage 705, and activation storage 720 may be on same processor or other hardware logic device or circuit, whereas in another embodiment, they may be in different processors or other hardware logic devices or circuits, or some combination of same and different processors or other hardware logic devices or circuits. In at least one embodiment, any portion of activation storage 720 may be included with other on-chip or off-chip data storage, including a processor's L1, L2, or L3 cache or system memory. Furthermore, inferencing and/or training code may be stored with other code accessible to a processor or other hardware logic or circuit and fetched and/or processed using a processor's fetch, decode, scheduling, execution, retirement and/or other logical circuits.

In at least one embodiment, activation storage 720 may be cache memory, DRAM, SRAM, non-volatile memory (e.g., Flash memory), or other storage. In at least one embodiment, activation storage 720 may be completely or partially within or external to one or more processors or other logical circuits. In at least one embodiment, choice of whether activation storage 720 is internal or external to a processor, for example, or comprised of DRAM, SRAM, Flash or some other storage type may depend on available storage on-chip versus off-chip, latency requirements of training and/or inferencing functions being performed, batch size of data used in inferencing and/or training of a neural network, or some combination of these factors. In at least one embodiment, inference and/or training logic 715 illustrated in FIG. 7A may be used in conjunction with an application-specific integrated circuit ("ASIC"), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7a may be used in conjunction with central processing unit ("CPU") hardware, graphics processing unit ("GPU") hardware or other hardware, such as field programmable gate arrays ("FPGAs").

Figure 7B:
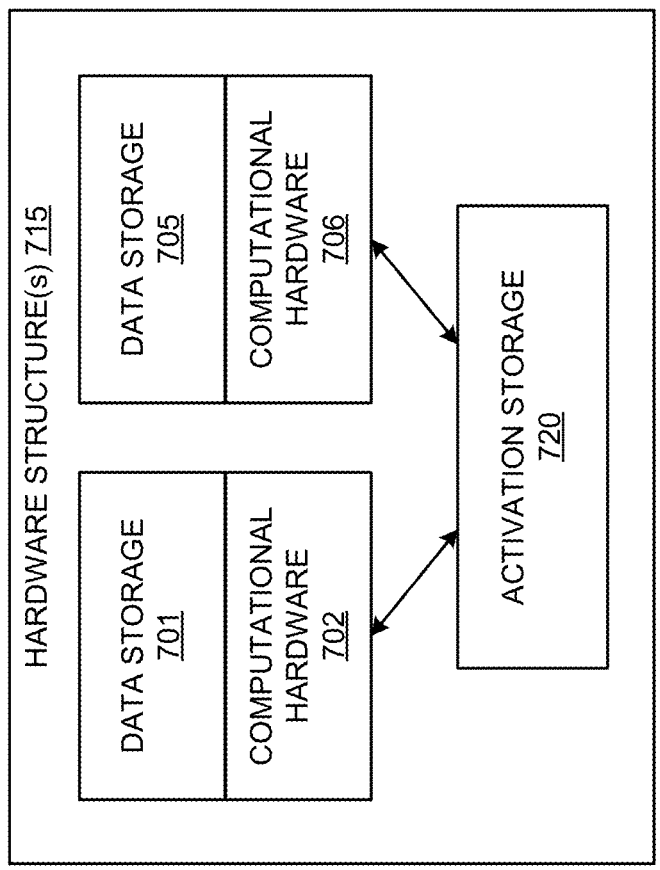
FIG. 7B illustrates inference and/or training logic, according to at least one embodiment.

FIG. 7b illustrates inference and/or training logic 715, according to at least one or more embodiments. In at least one embodiment, inference and/or training logic 715 may include, without limitation, hardware logic in which computational resources are dedicated or otherwise exclusively used in conjunction with weight values or other information corresponding to one or more layers of neurons within a neural network. In at least one embodiment, inference and/or training logic 715 illustrated in FIG. 7b may be used in conjunction with an application-specific integrated circuit (ASIC), such as Tensorflow® Processing Unit from Google, an inference processing unit (IPU) from Graphcore™, or a Nervana® (e.g., "Lake Crest") processor from Intel Corp. In at least one embodiment, inference and/or training logic 715 illustrated in FIG. 7b may be used in conjunction with central processing unit (CPU) hardware, graphics processing unit (GPU) hardware or other hardware, such as field programmable gate arrays (FPGAs). In at least one embodiment, inference and/or training logic 715 includes, without limitation, code and/or data storage 701 and code and/or data storage 705, which may be used to store code (e.g., graph code), weight values and/or other information, including bias values, gradient information, momentum values, and/or other parameter or hyperparameter information. In at least one embodiment illustrated in FIG. 7b, each of code and/or data storage 701 and code and/or data storage 705 is associated with a dedicated computational resource, such as computational hardware 702 and computational hardware 706, respectively. In at least one embodiment, each of computational hardware 702 and computational hardware 706 comprises one or more ALUs that perform mathematical functions, such as linear algebraic functions, only on information stored in code and/or data storage 701 and code and/or data storage 705, respectively, result of which is stored in activation storage 720.

In at least one embodiment, each of code and/or data storage 701 and 705 and corresponding computational hardware 702 and 706, respectively, correspond to different layers of a neural network, such that resulting activation from one "storage/computational pair 701/702" of code and/or data storage 701 and computational hardware 702 is provided as an input to "storage/computational pair 705/706" of code and/or data storage 705 and computational hardware 706, in order to mirror conceptual organization of a neural network. In at least one embodiment, each of storage/computational pairs 701/702 and 705/706 may correspond to more than one neural network layer. In at least one embodiment, additional storage/computation pairs (not shown) subsequent to or in parallel with storage computation pairs 701/702 and 705/706 may be included in inference and/or training logic 715.

Data Center

Figure 8:
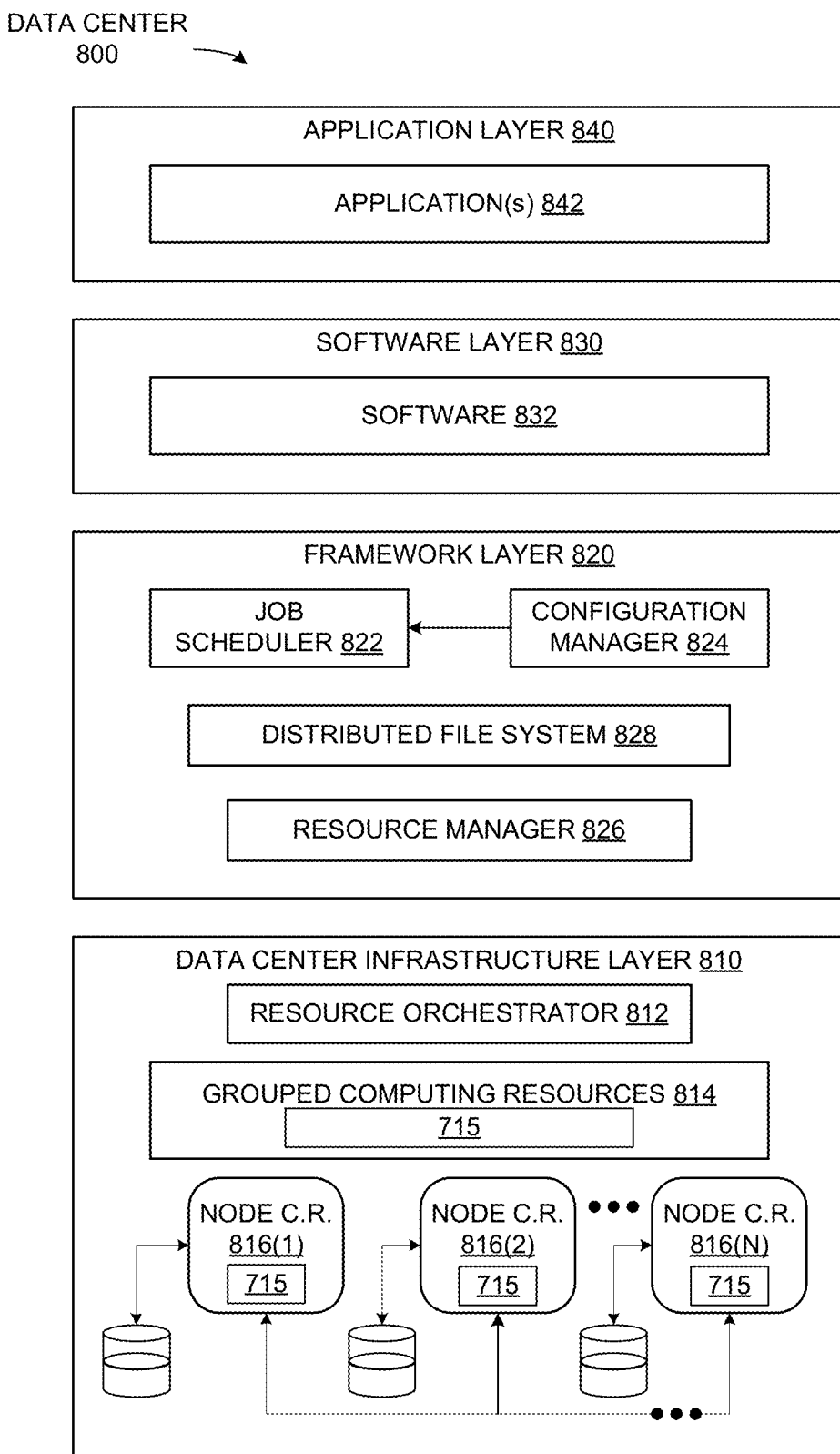
FIG. 8 illustrates an example data center system, according to at least one embodiment.

FIG. 8 illustrates an example data center 800, in which at least one embodiment may be used. In at least one embodiment, data center 800 includes a data center infrastructure layer 810, a framework layer 820, a software layer 830, and an application layer 840.

In at least one embodiment, as shown in FIG. 8, data center infrastructure layer 810 may include a resource orchestrator 812, grouped computing resources 814, and node computing resources ("node C.R.s") 816(1)-816(N), where "N" represents any whole, positive integer. In at least one embodiment, node C.R.s 816(1)-816(N) may include, but are not limited to, any number of central processing units ("CPUs") or other processors (including accelerators, field programmable gate arrays (FPGAs), graphics processors, etc.), memory devices (e.g., dynamic read-only memory), storage devices (e.g., solid state or disk drives), network input/output ("NW I/O") devices, network switches, virtual machines ("VMs"), power modules, and cooling modules, etc. In at least one embodiment, one or more node C.R.s from among node C.R.s 816(1)-816(N) may be a server having one or more of above-mentioned computing resources.

In at least one embodiment, grouped computing resources 814 may include separate groupings of node C.R.s housed within one or more racks (not shown), or many racks housed in data centers at various geographical locations (also not shown). Separate groupings of node C.R.s within grouped computing resources 814 may include grouped compute, network, memory or storage resources that may be configured or allocated to support one or more workloads. In at least one embodiment, several node C.R.s including CPUs or processors may grouped within one or more racks to provide compute resources to support one or more workloads. In at least one embodiment, one or more racks may also include any number of power modules, cooling modules, and network switches, in any combination.

In at least one embodiment, resource orchestrator 812 may configure or otherwise control one or more node C.R.s 816(1)-816(N) and/or grouped computing resources 814. In at least one embodiment, resource orchestrator 812 may include a software design infrastructure ("SDI") management entity for data center 800. In at least one embodiment, resource orchestrator may include hardware, software or some combination thereof.

In at least one embodiment, as shown in FIG. 8, framework layer 820 includes a job scheduler 822, a configuration manager 824, a resource manager 826 and a distributed file system 828. In at least one embodiment, framework layer 820 may include a framework to support software 832 of software layer 830 and/or one or more application(s) 842 of application layer 840. In at least one embodiment, software 832 or application(s) 842 may respectively include web-based service software or applications, such as those provided by Amazon Web Services, Google Cloud and Microsoft Azure. In at least one embodiment, framework layer 820 may be, but is not limited to, a type of free and open-source software web application framework such as Apache Spark™ (hereinafter "Spark") that may use distributed file system 828 for large-scale data processing (e.g., "big data"). In at least one embodiment, job scheduler 822 may include a Spark driver to facilitate scheduling of workloads supported by various layers of data center 800. In at least one embodiment, configuration manager 824 may be capable of configuring different layers such as software layer 830 and framework layer 820 including Spark and distributed file system 828 for supporting large-scale data processing. In at least one embodiment, resource manager 826 may be capable of managing clustered or grouped computing resources mapped to or allocated for support of distributed file system 828 and job scheduler 822. In at least one embodiment, clustered or grouped computing resources may include grouped computing resource 814 at data center infrastructure layer 810. In at least one embodiment, resource manager 826 may coordinate with resource orchestrator 812 to manage these mapped or allocated computing resources.

In at least one embodiment, software 832 included in software layer 830 may include software used by at least portions of node C.R.s 816(1)-816(N), grouped computing resources 814, and/or distributed file system 828 of framework layer 820. The one or more types of software may include, but are not limited to, Internet web page search software, e-mail virus scan software, database software, and streaming video content software.

In at least one embodiment, application(s) 842 included in application layer 840 may include one or more types of applications used by at least portions of node C.R.s 816(1)-816(N), grouped computing resources 814, and/or distributed file system 828 of framework layer 820. One or more types of applications may include, but are not limited to, any number of a genomics application, a cognitive compute, and a machine learning application, including training or inferencing software, machine learning framework software (e.g., PyTorch, TensorFlow, Caffe, etc.) or other machine learning applications used in conjunction with one or more embodiments.

In at least one embodiment, any of configuration manager 824, resource manager 826, and resource orchestrator 812 may implement any number and type of self-modifying actions based on any amount and type of data acquired in any technically feasible fashion. In at least one embodiment, self-modifying actions may relieve a data center operator of data center 800 from making possibly bad configuration decisions and possibly avoiding underused and/or poor performing portions of a data center.

In at least one embodiment, data center 800 may include tools, services, software or other resources to train one or more machine learning models or predict or infer information using one or more machine learning models according to one or more embodiments described herein. For example, in at least one embodiment, a machine learning model may be trained by calculating weight parameters according to a neural network architecture using software and computing resources described above with respect to data center 800. In at least one embodiment, trained machine learning models corresponding to one or more neural networks may be used to infer or predict information using resources described above with respect to data center 800 by using weight parameters calculated through one or more training techniques described herein.

In at least one embodiment, data center may use CPUs, application-specific integrated circuits (ASICs), GPUs, FPGAs, or other hardware to perform training and/or inferencing using above-described resources. Moreover, one or more software and/or hardware resources described above may be configured as a service to allow users to train or performing inferencing of information, such as image recognition, speech recognition, or other artificial intelligence services.

Inference and/or training logic 715 are used to perform inferencing and/or training operations associated with one or more embodiments. Details regarding inference and/or training logic 715 are provided below in conjunction with FIGS. 7a and/or 7b8b. In at least one embodiment, inference and/or training logic 715 may be used in system FIG. 8 for inferencing or predicting operations based, at least in part, on weight parameters calculated using neural network training operations, neural network functions and/or architectures, or neural network use cases described herein.

Such components can be used to synthesize new content using visual aspects of at least one first content instance and geometric aspects of at least one second content instance.

Computer Systems

Figure 9:
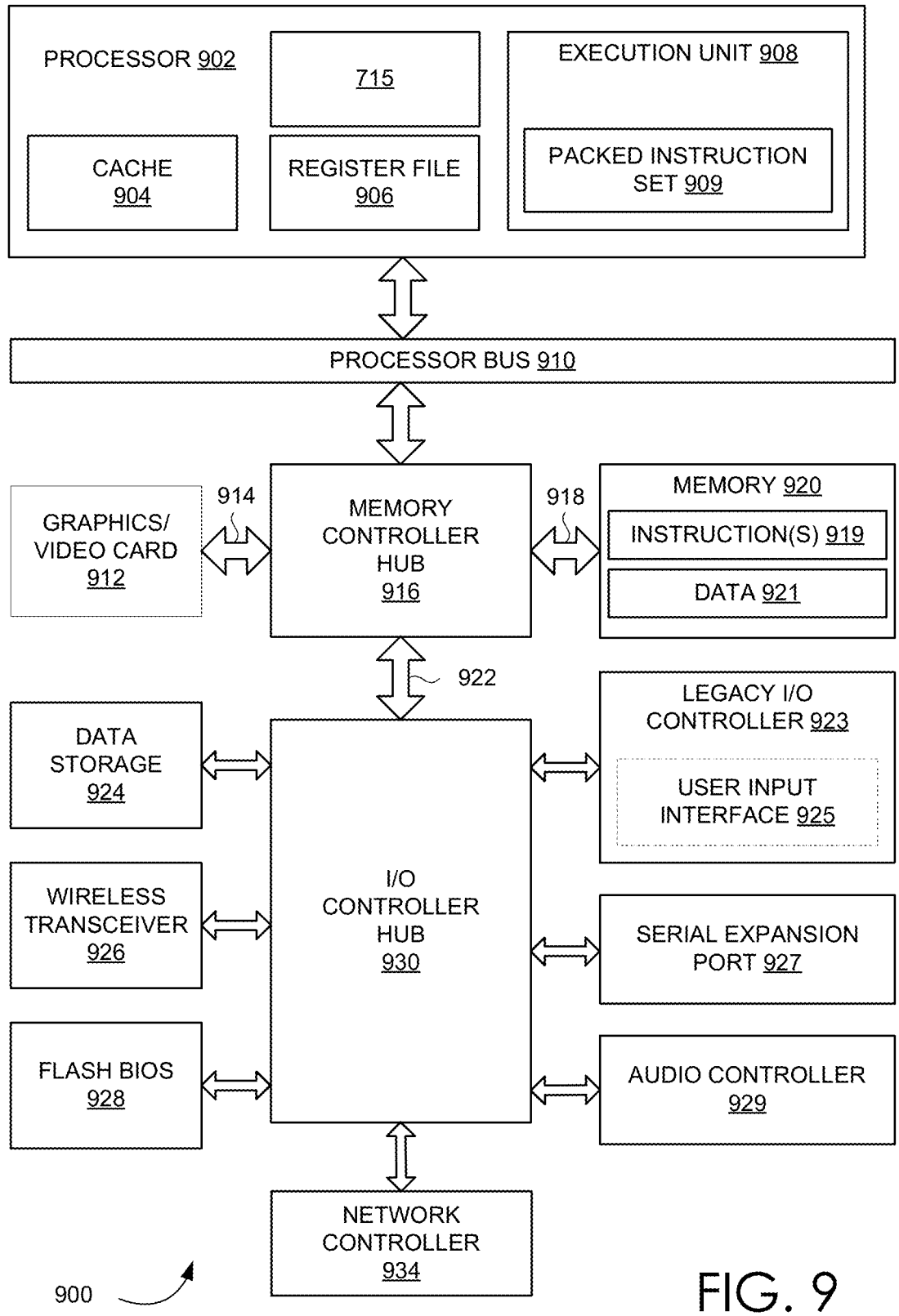
FIG. 9 illustrates a computer system, according to at least one embodiment.

FIG. 9 is a block diagram illustrating an exemplary computer system, which may be a system with interconnected devices and components, a system-on-a-chip (SOC) or some combination thereof 900 formed with a processor that may include execution units to execute an instruction, according to at least one embodiment. In at least one embodiment, computer system 900 may include, without limitation, a component, such as a processor 902 to employ execution units including logic to perform algorithms for process data, in accordance with present disclosure, such as in embodiment described herein. In at least one embodiment, computer system 900 may include processors, such as PENTIUM® Processor family, Xeon™, Itanium®, XScale™ and/or StrongARM™, Intel® Core™, or Intel® Nervana™ microprocessors available from Intel Corporation of Santa Clara, California, although other systems (including PCs having other microprocessors, engineering workstations, set-top boxes and like) may also be used. In at least one embodiment, computer system 900 may execute a version of WINDOWS' operating system available from Microsoft Corporation of Redmond, Wash., although other operating systems (UNIX and Linux for example), embedded software, and/or graphical user interfaces, may also be used.

Embodiments may be used in other devices such as handheld devices and embedded applications. Some examples of handheld devices include cellular phones, Internet Protocol devices, digital cameras, personal digital assistants ("PDAs"), and handheld PCs. In at least one embodiment, embedded applications may include a microcontroller, a digital signal processor ("DSP"), system on a chip, network computers ("NetPCs"), set-top boxes, network hubs, wide area network ("WAN") switches, or any other system that may perform one or more instructions in accordance with at least one embodiment.

In at least one embodiment, computer system 900 may include, without limitation, processor 902 that may include, without limitation, one or more execution units 908 to perform machine learning model training and/or inferencing according to techniques described herein. In at least one embodiment, computer system 900 is a single processor desktop or server system, but in another embodiment computer system 900 may be a multiprocessor system. In at least one embodiment, processor 902 may include, without limitation, a complex instruction set computer ("CISC") microprocessor, a reduced instruction set computing ("RISC") microprocessor, a very long instruction word ("VLIW") microprocessor, a processor implementing a combination of instruction sets, or any other processor device, such as a digital signal processor, for example. In at least one embodiment, processor 902 may be coupled to a processor bus 910 that may transmit data signals between processor 902 and other components in computer system 900.

In at least one embodiment, processor 902 may include, without limitation, a Level 1 ("L1") internal cache memory ("cache") 904. In at least one embodiment, processor 902 may have a single internal cache or multiple levels of internal cache. In at least one embodiment, cache memory may reside external to processor 902. Other embodiments may also include a combination of both internal and external caches depending on particular implementation and needs. In at least one embodiment, register file 906 may store different types of data in various registers including, without limitation, integer registers, floating point registers, status registers, and instruction pointer register.

In at least one embodiment, execution unit 908, including, without limitation, logic to perform integer and floating point operations, also resides in processor 902. In at least one embodiment, processor 902 may also include a microcode ("ucode") read only memory ("ROM") that stores microcode for certain macro instructions. In at least one embodiment, execution unit 908 may include logic to handle a packed instruction set 909. In at least one embodiment, by including packed instruction set 909 in an instruction set of a general-purpose processor 902, along with associated circuitry to execute instructions, operations used by many multimedia applications may be performed using packed data in a general-purpose processor 902. In one or more embodiments, many multimedia applications may be accelerated and executed more efficiently by using full width of a processor's data bus for performing operations on packed data, which may eliminate need to transfer smaller units of data across processor's data bus to perform one or more operations one data element at a time.

In at least one embodiment, execution unit 908 may also be used in microcontrollers, embedded processors, graphics devices, DSPs, and other types of logic circuits. In at least one embodiment, computer system 900 may include, without limitation, a memory 920. In at least one embodiment, memory 920 may be implemented as a Dynamic Random Access Memory ("DRAM") device, a Static Random Access Memory ("SRAM") device, flash memory device, or other memory device. In at least one embodiment, memory 920 may store instruction(s) 919 and/or data 921 represented by data signals that may be executed by processor 902.

In at least one embodiment, system logic chip may be coupled to processor bus 910 and memory 920. In at least one embodiment, system logic chip may include, without limitation, a memory controller hub ("MCH") 916, and processor 902 may communicate with MCH 916 via processor bus 910. In at least one embodiment, MCH 916 may provide a high bandwidth memory path 918 to memory 920 for instruction and data storage and for storage of graphics commands, data and textures. In at least one embodiment, MCH 916 may direct data signals between processor 902, memory 920, and other components in computer system 900 and to bridge data signals between processor bus 910, memory 920, and a system I/O 922. In at least one embodiment, system logic chip may provide a graphics port for coupling to a graphics controller. In at least one embodiment, MCH 916 may be coupled to memory 920 through a high bandwidth memory path 918 and graphics/video card 912 may be coupled to MCH 916 through an Accelerated Graphics Port ("AGP") interconnect 914.

In at least one embodiment, computer system 900 may use system I/O 922 that is a proprietary hub interface bus to couple MCH 916 to I/O controller hub ("ICH") 930. In at least one embodiment, ICH 930 may provide direct connections to some I/O devices via a local I/O bus. In at least one embodiment, local I/O bus may include, without limitation, a high-speed I/O bus for connecting peripherals to memory 920, chipset, and processor 902. Examples may include, without limitation, an audio controller 929, a firmware hub ("flash BIOS") 928, a wireless transceiver 926, a data storage 924, a legacy I/O controller 923 containing user input and keyboard interfaces 925, a serial expansion port 927, such as Universal Serial Bus ("USB"), and a network controller 934. Data storage 924 may comprise a hard disk drive, a floppy disk drive, a CD-ROM device, a flash memory device, or other mass storage device.

In at least one embodiment, FIG. 9 illustrates a system, which includes interconnected hardware devices or "chips", whereas in other embodiments, FIG. 9 may illustrate an exemplary System on a Chip ("SoC"). In at least one embodiment, devices may be interconnected with proprietary interconnects, standardized interconnects (e.g., PCIe) or some combination thereof. In at least one embodiment, one or more components of computer system 900 are interconnected using compute express link (CXL) interconnects.

Inference and/or training logic 715 are used to perform inferencing and/or training operations associated with one or more embodiments. Details regarding inference and/or training logic 715 are provided below in conjunction with FIGS. 7a and/or 7b&8b. In at least one embodiment, inference and/or training logic 715 may be used in system FIG. 9 for inferencing or predicting operations based, at least in part, on weight parameters calculated using neural network training operations, neural network functions and/or architectures, or neural network use cases described herein.

Such components can be used to synthesize new content using visual aspects of at least one first content instance and geometric aspects of at least one second content instance.

Figure 10:
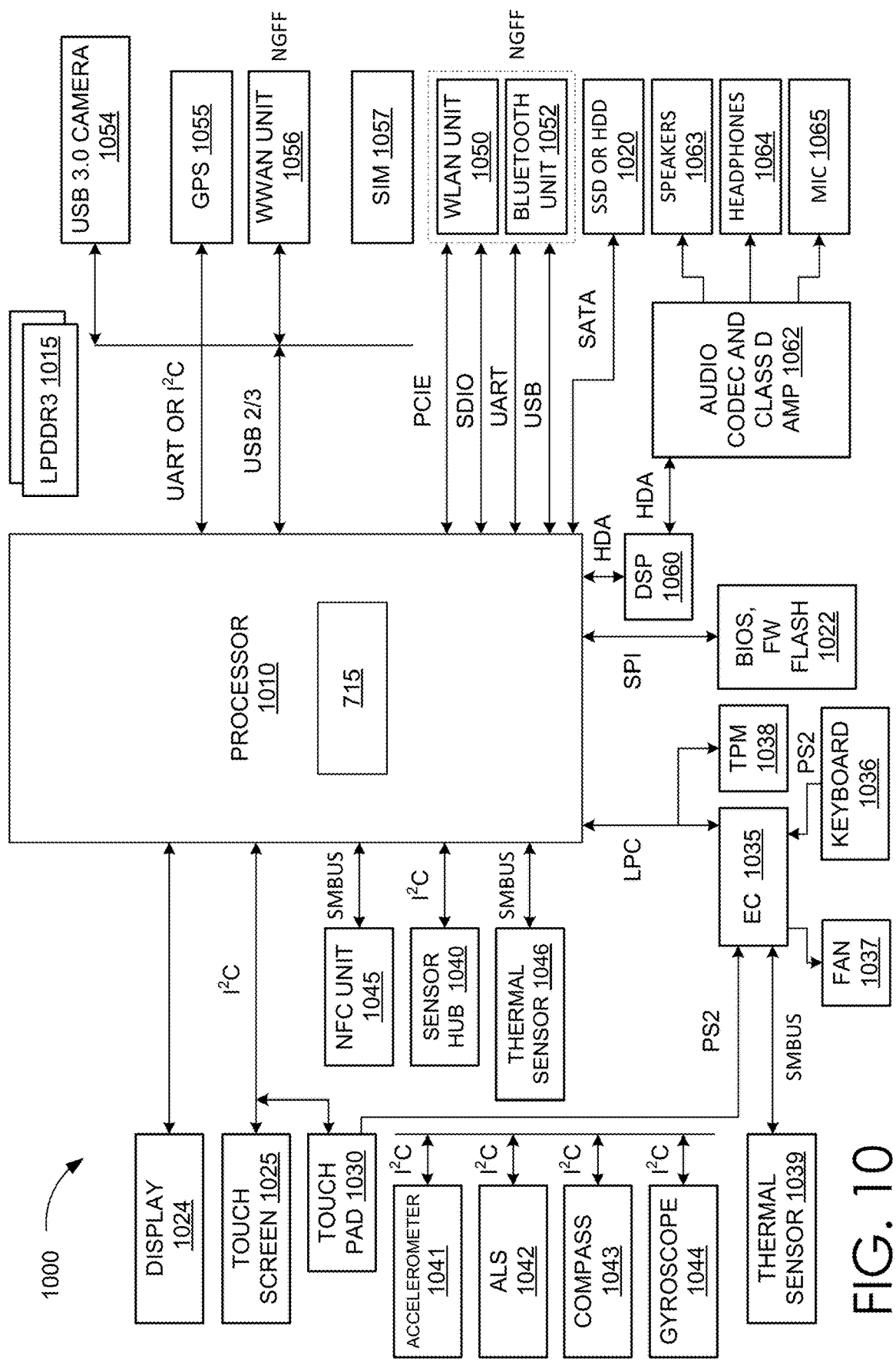
FIG. 10 illustrates a computer system, according to at least one embodiment.

FIG. 10 is a block diagram illustrating an electronic device 1000 for utilizing a processor 1010, according to at least one embodiment. In at least one embodiment, electronic device 1000 may be, for example and without limitation, a notebook, a tower server, a rack server, a blade server, a laptop, a desktop, a tablet, a mobile device, a phone, an embedded computer, or any other suitable electronic device.

In at least one embodiment, system 1000 may include, without limitation, processor 1010 communicatively coupled to any suitable number or kind of components, peripherals, modules, or devices. In at least one embodiment, processor 1010 coupled using a bus or interface, such as a 1° C. bus, a System Management Bus ("SMBus"), a Low Pin Count (LPC) bus, a Serial Peripheral Interface ("SPI"), a High Definition Audio ("HDA") bus, a Serial Advance Technology Attachment ("SATA") bus, a Universal Serial Bus ("USB") (versions 1, 2, 3), or a Universal Asynchronous Receiver/Transmitter ("UART") bus. In at least one embodiment, FIG. 10 illustrates a system, which includes interconnected hardware devices or "chips", whereas in other embodiments, FIG. 10 may illustrate an exemplary System on a Chip ("SoC"). In at least one embodiment, devices illustrated in FIG. 10 may be interconnected with proprietary interconnects, standardized interconnects (e.g., PCIe) or some combination thereof. In at least one embodiment, one or more components of FIG. 10 are interconnected using compute express link (CXL) interconnects.

In at least one embodiment, FIG. 10 may include a display 1024, a touch screen 1025, a touch pad 1030, a Near Field Communications unit ("NFC") 1045, a sensor hub 1040, a thermal sensor 1046, an Express Chipset ("EC") 1035, a Trusted Platform Module ("TPM") 1038, BIOS/firmware/flash memory ("BIOS, FW Flash") 1022, a DSP 1060, a drive 1020 such as a Solid State Disk ("SSD") or a Hard Disk Drive ("HDD"), a wireless local area network unit ("WLAN") 1050, a Bluetooth unit 1052, a Wireless Wide Area Network unit ("WWAN") 1056, a Global Positioning System (GPS) 1055, a camera ("USB 3.0 camera") 1054 such as a USB 3.0 camera, and/or a Low Power Double Data Rate ("LPDDR") memory unit ("LPDDR3") 1015 implemented in, for example, LPDDR3 standard. These components may each be implemented in any suitable manner.

In at least one embodiment, other components may be communicatively coupled to processor 1010 through components discussed above. In at least one embodiment, an accelerometer 1041, Ambient Light Sensor ("ALS") 1042, compass 1043, and a gyroscope 1044 may be communicatively coupled to sensor hub 1040. In at least one embodiment, thermal sensor 1039, a fan 1037, a keyboard 1046, and a touch pad 1030 may be communicatively coupled to EC 1035. In at least one embodiment, speaker 1063, headphones 1064, and microphone ("mic") 1065 may be communicatively coupled to an audio unit ("audio codec and class d amp") 1062, which may in turn be communicatively coupled to DSP 1060. In at least one embodiment, audio unit 1064 may include, for example and without limitation, an audio coder/decoder ("codec") and a class D amplifier. In at least one embodiment, SIM card ("SIM") 1057 may be communicatively coupled to WWAN unit 1056. In at least one embodiment, components such as WLAN unit 1050 and Bluetooth unit 1052, as well as WWAN unit 1056 may be implemented in a Next Generation Form Factor ("NGFF").

Inference and/or training logic 715 are used to perform inferencing and/or training operations associated with one or more embodiments. Details regarding inference and/or training logic 715 are provided below in conjunction with FIGS. 7a and/or 7b8b. In at least one embodiment, inference and/or training logic 715 may be used in system FIG. 10 for inferencing or predicting operations based, at least in part, on weight parameters calculated using neural network training operations, neural network functions and/or architectures, or neural network use cases described herein.

Such components can be used to synthesize new content using visual aspects of at least one first content instance and geometric aspects of at least one second content instance.

Figure 11:
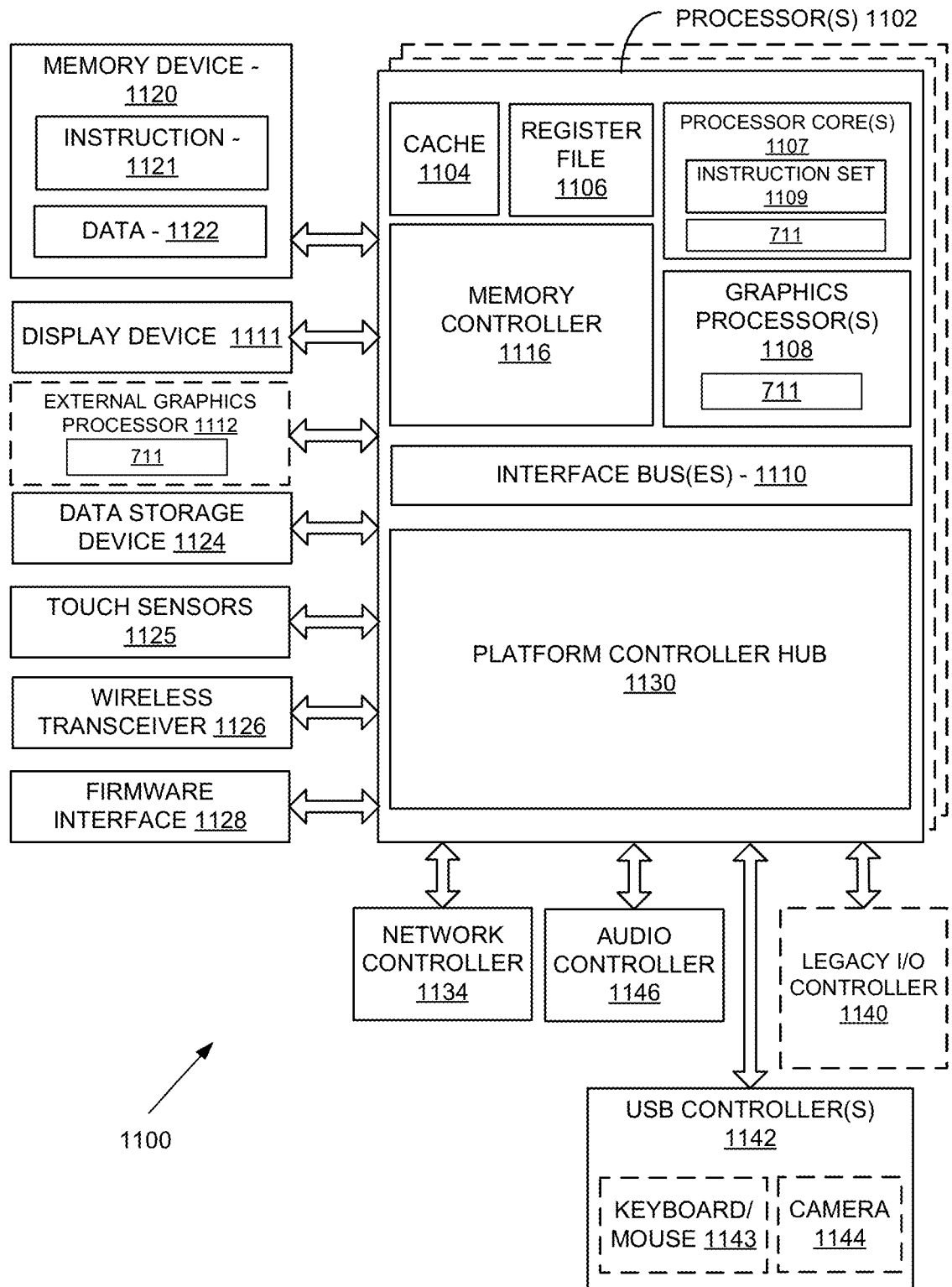
FIG. 11 illustrates at least portions of a graphics processor, according to one or more embodiments.

FIG. 11 is a block diagram of a processing system, according to at least one embodiment. In at least one embodiment, system 1100 includes one or more processors 1102 and one or more graphics processors 1108, and may be a single processor desktop system, a multiprocessor workstation system, or a server system having a large number of processors 1102 or processor cores 1107. In at least one embodiment, system 1100 is a processing platform incorporated within a system-on-a-chip (SoC) integrated circuit for use in mobile, handheld, or embedded devices.

In at least one embodiment, system 1100 can include, or be incorporated within a server-based gaming platform, a game console, including a game and media console, a mobile gaming console, a handheld game console, or an online game console. In at least one embodiment, system 1100 is a mobile phone, smart phone, tablet computing device or mobile Internet device. In at least one embodiment, processing system 1100 can also include, couple with, or be integrated within a wearable device, such as a smart watch wearable device, smart eyewear device, augmented reality device, or virtual reality device. In at least one embodiment, processing system 1100 is a television or set top box device having one or more processors 1102 and a graphical interface generated by one or more graphics processors 1108.

In at least one embodiment, one or more processors 1102 each include one or more processor cores 1107 to process instructions which, when executed, perform operations for system and user software. In at least one embodiment, each of one or more processor cores 1107 is configured to process a specific instruction set 1109. In at least one embodiment, instruction set 1109 may facilitate Complex Instruction Set Computing (CISC), Reduced Instruction Set Computing (RISC), or computing via a Very Long Instruction Word (VLIW). In at least one embodiment, processor cores 1107 may each process a different instruction set 1109, which may include instructions to facilitate emulation of other instruction sets. In at least one embodiment, processor core 1107 may also include other processing devices, such a Digital Signal Processor (DSP).

In at least one embodiment, processor 1102 includes cache memory 1104. In at least one embodiment, processor 1102 can have a single internal cache or multiple levels of internal cache. In at least one embodiment, cache memory is shared among various components of processor 1102. In at least one embodiment, processor 1102 also uses an external cache (e.g., a Level-3 (L3) cache or Last Level Cache (LLC)) (not shown), which may be shared among processor cores 1107 using known cache coherency techniques. In at least one embodiment, register file 1106 is additionally included in processor 1102 which may include different types of registers for storing different types of data (e.g., integer registers, floating point registers, status registers, and an instruction pointer register). In at least one embodiment, register file 1106 may include general-purpose registers or other registers.

In at least one embodiment, one or more processor(s) 1102 are coupled with one or more interface bus(es) 1110 to transmit communication signals such as address, data, or control signals between processor 1102 and other components in system 1100. In at least one embodiment, interface bus 1110, in one embodiment, can be a processor bus, such as a version of a Direct Media Interface (DMI) bus. In at least one embodiment, interface 1110 is not limited to a DMI bus, and may include one or more Peripheral Component Interconnect buses (e.g., PCI, PCI Express), memory busses, or other types of interface busses. In at least one embodiment processor(s) 1102 include an integrated memory controller 1116 and a platform controller hub 1130. In at least one embodiment, memory controller 1116 facilitates communication between a memory device and other components of system 1100, while platform controller hub (PCH) 1130 provides connections to I/O devices via a local I/O bus.

In at least one embodiment, memory device 1120 can be a dynamic random access memory (DRAM) device, a static random access memory (SRAM) device, flash memory device, phase-change memory device, or some other memory device having suitable performance to serve as process memory. In at least one embodiment memory device 1120 can operate as system memory for system 1100, to store data 1122 and instructions 1121 for use when one or more processors 1102 executes an application or process. In at least one embodiment, memory controller 1116 also couples with an optional external graphics processor 1112, which may communicate with one or more graphics processors 1108 in processors 1102 to perform graphics and media operations. In at least one embodiment, a display device 1111 can connect to processor(s) 1102. In at least one embodiment display device 1111 can include one or more of an internal display device, as in a mobile electronic device or a laptop device or an external display device attached via a display interface (e.g., DisplayPort, etc.). In at least one embodiment, display device 1111 can include a head mounted display (HMD) such as a stereoscopic display device for use in virtual reality (VR) applications or augmented reality (AR) applications.

In at least one embodiment, platform controller hub 1130 enables peripherals to connect to memory device 1120 and processor 1102 via a high-speed I/O bus. In at least one embodiment, I/O peripherals include, but are not limited to, an audio controller 1146, a network controller 1134, a firmware interface 1128, a wireless transceiver 1126, touch sensors 1125, a data storage device 1124 (e.g., hard disk drive, flash memory, etc.). In at least one embodiment, data storage device 1124 can connect via a storage interface (e.g., SATA) or via a peripheral bus, such as a Peripheral Component Interconnect bus (e.g., PCI, PCI Express). In at least one embodiment, touch sensors 1125 can include touch screen sensors, pressure sensors, or fingerprint sensors. In at least one embodiment, wireless transceiver 1126 can be a Wi-Fi transceiver, a Bluetooth transceiver, or a mobile network transceiver such as a 3G, 4G, or Long Term Evolution (LTE) transceiver. In at least one embodiment, firmware interface 1128 enables communication with system firmware, and can be, for example, a unified extensible firmware interface (UEFI). In at least one embodiment, network controller 1134 can enable a network connection to a wired network. In at least one embodiment, a high-performance network controller (not shown) couples with interface bus 1110. In at least one embodiment, audio controller 1146 is a multi-channel high definition audio controller. In at least one embodiment, system 1100 includes an optional legacy I/O controller 1140 for coupling legacy (e.g., Personal System 2 (PS/2)) devices to system. In at least one embodiment, platform controller hub 1130 can also connect to one or more Universal Serial Bus (USB) controllers 1142 connect input devices, such as keyboard and mouse 1143 combinations, a camera 1144, or other USB input devices.

In at least one embodiment, an instance of memory controller 1116 and platform controller hub 1130 may be integrated into a discreet external graphics processor, such as external graphics processor 1112. In at least one embodiment, platform controller hub 1130 and/or memory controller 1116 may be external to one or more processor(s) 1102. For example, in at least one embodiment, system 1100 can include an external memory controller 1116 and platform controller hub 1130, which may be configured as a memory controller hub and peripheral controller hub within a system chipset that is in communication with processor(s) 1102.

Inference and/or training logic 715 are used to perform inferencing and/or training operations associated with one or more embodiments. Details regarding inference and/or training logic 715 are provided below in conjunction with FIGS. 7a and/or 7b8b. In at least one embodiment portions or all of inference and/or training logic 715 may be incorporated into graphics processor 1500. For example, in at least one embodiment, training and/or inferencing techniques described herein may use one or more of ALUs embodied in a graphics processor. Moreover, in at least one embodiment, inferencing and/or training operations described herein may be done using logic other than logic illustrated in FIG. 8A or 8B. In at least one embodiment, weight parameters may be stored in on-chip or off-chip memory and/or registers (shown or not shown) that configure ALUs of a graphics processor to perform one or more machine learning algorithms, neural network architectures, use cases, or training techniques described herein.

Such components can be used to synthesize new content using visual aspects of at least one first content instance and geometric aspects of at least one second content instance.

Figure 12:
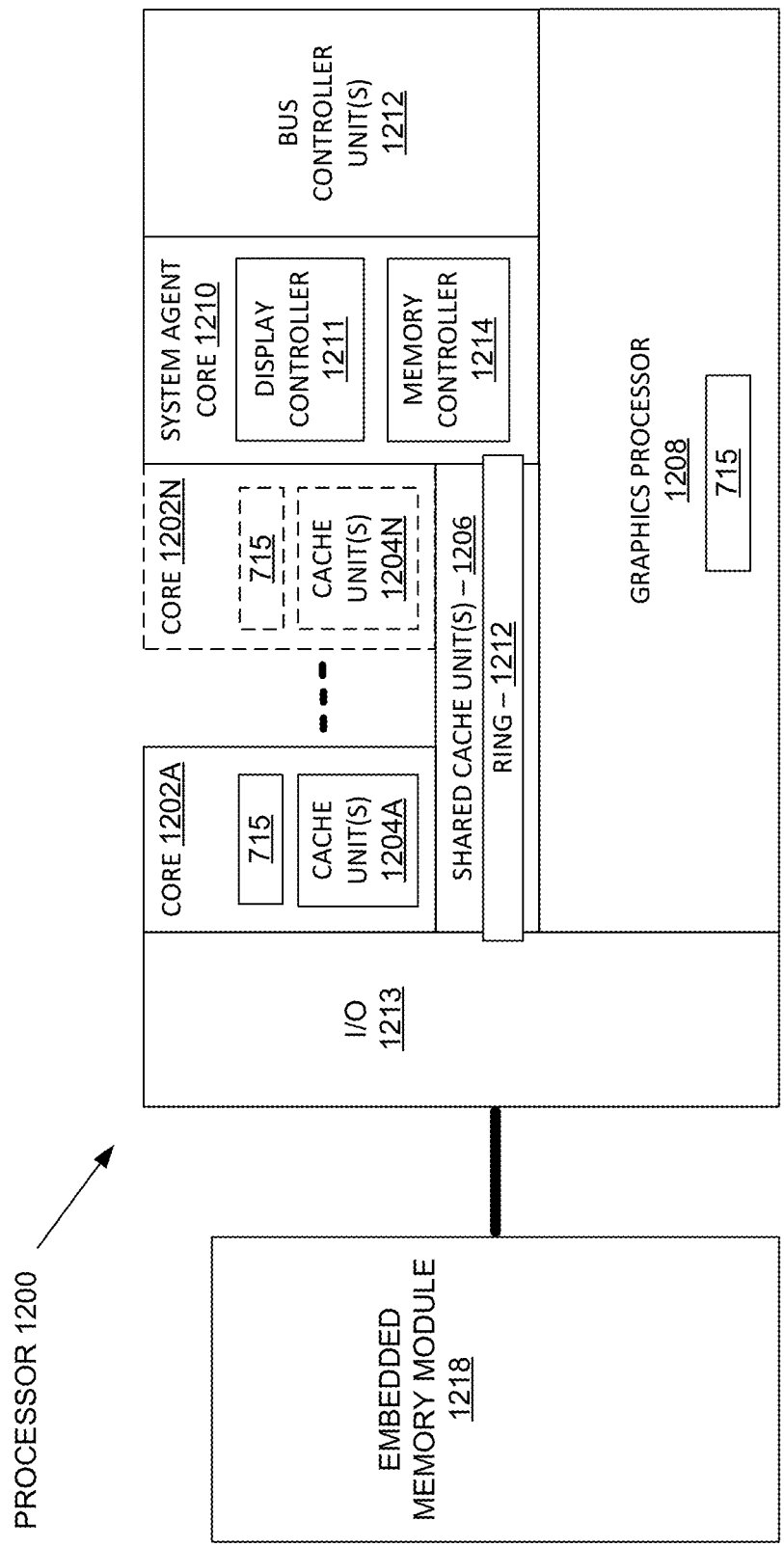
FIG. 12 illustrates at least portions of a graphics processor, according to one or more embodiments.

FIG. 12 is a block diagram of a processor 1200 having one or more processor cores 1202A-1202N, an integrated memory controller 1214, and an integrated graphics processor 1208, according to at least one embodiment. In at least one embodiment, processor 1200 can include additional cores up to and including additional core 1202N represented by dashed lined boxes. In at least one embodiment, each of processor cores 1202A-1202N includes one or more internal cache units 1204A-1204N. In at least one embodiment, each processor core also has access to one or more shared cached units 1206.

In at least one embodiment, internal cache units 1204A-1204N and shared cache units 1206 represent a cache memory hierarchy within processor 1200. In at least one embodiment, cache memory units 1204A-1204N may include at least one level of instruction and data cache within each processor core and one or more levels of shared mid-level cache, such as a Level 2 (L2), Level 3 (L3), Level 4 (L4), or other levels of cache, where a highest level of cache before external memory is classified as an LLC. In at least one embodiment, cache coherency logic maintains coherency between various cache units 1206 and 1204A-1204N.

In at least one embodiment, processor 1200 may also include a set of one or more bus controller units 1216 and a system agent core 1210. In at least one embodiment, one or more bus controller units 1216 manage a set of peripheral buses, such as one or more PCI or PCI express busses. In at least one embodiment, system agent core 1210 provides management functionality for various processor components. In at least one embodiment, system agent core 1210 includes one or more integrated memory controllers 1214 to manage access to various external memory devices (not shown).

In at least one embodiment, one or more of processor cores 1202A-1202N include support for simultaneous multi-threading. In at least one embodiment, system agent core 1210 includes components for coordinating and operating cores 1202A-1202N during multi-threaded processing. In at least one embodiment, system agent core 1210 may additionally include a power control unit (PCU), which includes logic and components to regulate one or more power states of processor cores 1202A-1202N and graphics processor 1208.

In at least one embodiment, processor 1200 additionally includes graphics processor 1208 to execute graphics processing operations. In at least one embodiment, graphics processor 1208 couples with shared cache units 1206, and system agent core 1210, including one or more integrated memory controllers 1214. In at least one embodiment, system agent core 1210 also includes a display controller 1211 to drive graphics processor output to one or more coupled displays. In at least one embodiment, display controller 1211 may also be a separate module coupled with graphics processor 1208 via at least one interconnect, or may be integrated within graphics processor 1208.

In at least one embodiment, a ring based interconnect unit 1212 is used to couple internal components of processor 1200. In at least one embodiment, an alternative interconnect unit may be used, such as a point-to-point interconnect, a switched interconnect, or other techniques. In at least one embodiment, graphics processor 1208 couples with ring interconnect 1212 via an I/O link 1213.

In at least one embodiment, I/O link 1213 represents at least one of multiple varieties of I/O interconnects, including an on package I/O interconnect which facilitates communication between various processor components and a high-performance embedded memory module 1218, such as an eDRAM module. In at least one embodiment, each of processor cores 1202A-1202N and graphics processor 1208 use embedded memory modules 1218 as a shared Last Level Cache.

In at least one embodiment, processor cores 1202A-1202N are homogenous cores executing a common instruction set architecture. In at least one embodiment, processor cores 1202A-1202N are heterogeneous in terms of instruction set architecture (ISA), where one or more of processor cores 1202A-1202N execute a common instruction set, while one or more other cores of processor cores 1202A-1202N executes a subset of a common instruction set or a different instruction set. In at least one embodiment, processor cores 1202A-1202N are heterogeneous in terms of microarchitecture, where one or more cores having a relatively higher power consumption couple with one or more power cores having a lower power consumption. In at least one embodiment, processor 1200 can be implemented on one or more chips or as an SoC integrated circuit.

Inference and/or training logic 715 are used to perform inferencing and/or training operations associated with one or more embodiments. Details regarding inference and/or training logic 715 are provided below in conjunction with FIGS. 7a and/or 7b. In at least one embodiment portions or all of inference and/or training logic 715 may be incorporated into processor 1200. For example, in at least one embodiment, training and/or inferencing techniques described herein may use one or more of ALUs embodied in graphics processor 1212, graphics core(s) 1202A-1202N, or other components in FIG. 12. Moreover, in at least one embodiment, inferencing and/or training operations described herein may be done using logic other than logic illustrated in FIG. 7A or 7B. In at least one embodiment, weight parameters may be stored in on-chip or off-chip memory and/or registers (shown or not shown) that configure ALUs of graphics processor 1200 to perform one or more machine learning algorithms, neural network architectures, use cases, or training techniques described herein.

Such components can be used to synthesize new content using visual aspects of at least one first content instance and geometric aspects of at least one second content instance.

Virtualized Computing Platform

Figure 13:
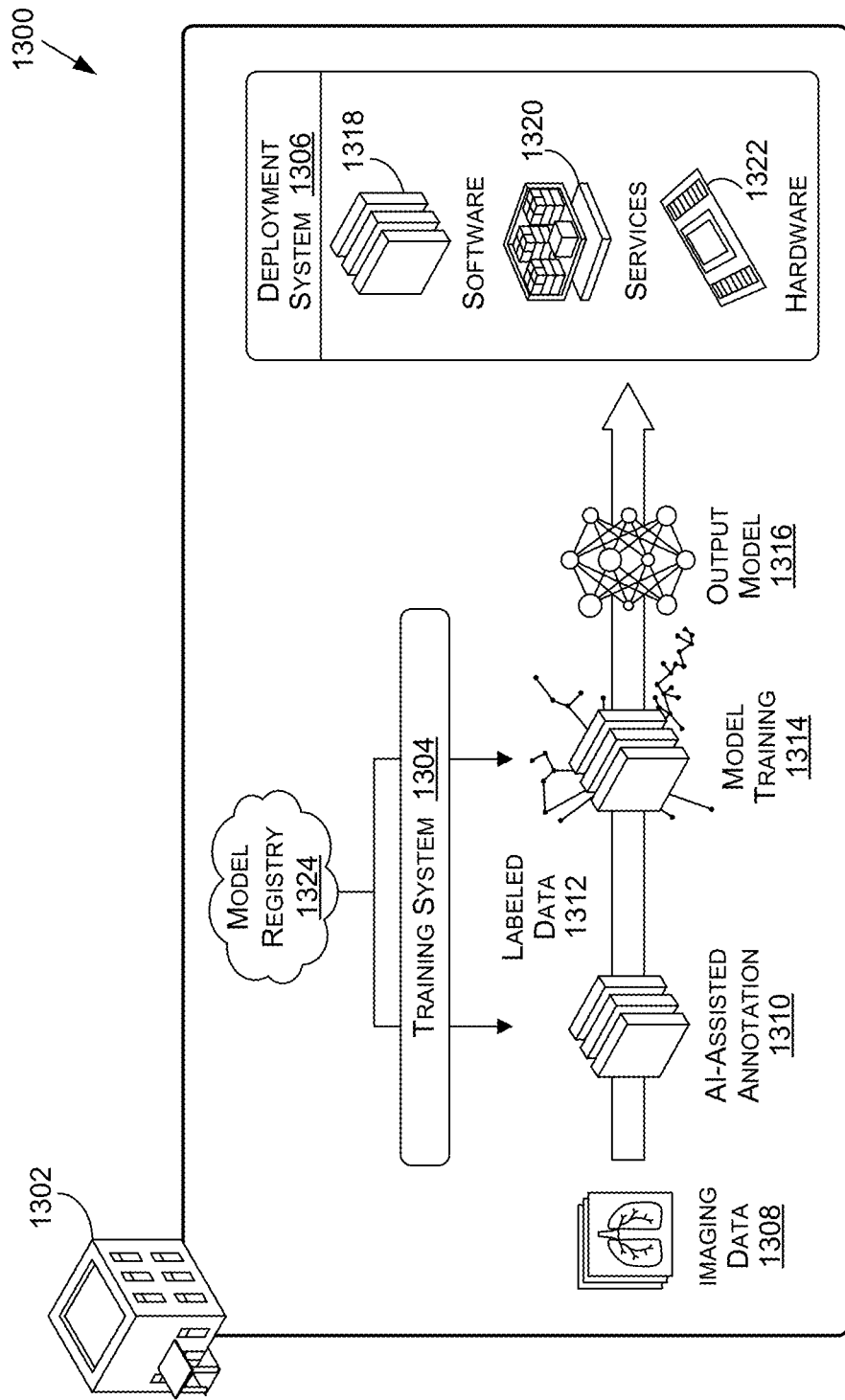
FIG. 13 is an example data flow diagram for an advanced computing pipeline, in accordance with at least one embodiment.

FIG. 13 is an example data flow diagram for a process 1300 of generating and deploying an image processing and inferencing pipeline, in accordance with at least one embodiment. In at least one embodiment, process 1300 may be deployed for use with imaging devices, processing devices, and/or other device types at one or more facilities 1302. Process 1300 may be executed within a training system 1304 and/or a deployment system 1306. In at least one embodiment, training system 1304 may be used to perform training, deployment, and implementation of machine learning models (e.g., neural networks, object detection algorithms, computer vision algorithms, etc.) for use in deployment system 1306. In at least one embodiment, deployment system 1306 may be configured to offload processing and compute resources among a distributed computing environment to reduce infrastructure requirements at facility 1302. In at least one embodiment, one or more applications in a pipeline may use or call upon services (e.g., inference, visualization, compute, AI, etc.) of deployment system 1306 during execution of applications.

In at least one embodiment, some of applications used in advanced processing and inferencing pipelines may use machine learning models or other AI to perform one or more processing steps. In at least one embodiment, machine learning models may be trained at facility 1302 using data 1308 (such as imaging data) generated at facility 1302 (and stored on one or more picture archiving and communication system (PACS) servers at facility 1302), may be trained using imaging or sequencing data 1308 from another facility(ies), or a combination thereof. In at least one embodiment, training system 1304 may be used to provide applications, services, and/or other resources for generating working, deployable machine learning models for deployment system 1306.

In at least one embodiment, model registry 1324 may be backed by object storage that may support versioning and object metadata. In at least one embodiment, object storage may be accessible through, for example, a cloud storage (e.g., cloud 1226 of FIG. 12) compatible application programming interface (API) from within a cloud platform. In at least one embodiment, machine learning models within model registry 1324 may uploaded, listed, modified, or deleted by developers or partners of a system interacting with an API. In at least one embodiment, an API may provide access to methods that allow users with appropriate credentials to associate models with applications, such that models may be executed as part of execution of containerized instantiations of applications.

In at least one embodiment, training pipeline 1304 (FIG. 13) may include a scenario where facility 1302 is training their own machine learning model, or has an existing machine learning model that needs to be optimized or updated. In at least one embodiment, imaging data 1308 generated by imaging device(s), sequencing devices, and/or other device types may be received. In at least one embodiment, once imaging data 1308 is received, AI-assisted annotation 1310 may be used to aid in generating annotations corresponding to imaging data 1308 to be used as ground truth data for a machine learning model. In at least one embodiment, AI-assisted annotation 1310 may include one or more machine learning models (e.g., convolutional neural networks (CNNs)) that may be trained to generate annotations corresponding to certain types of imaging data 1308 (e.g., from certain devices). In at least one embodiment, AI-assisted annotations 1310 may then be used directly, or may be adjusted or fine-tuned using an annotation tool to generate ground truth data. In at least one embodiment, AI-assisted annotations 1310, labeled clinic data 1312, or a combination thereof may be used as ground truth data for training a machine learning model. In at least one embodiment, a trained machine learning model may be referred to as output model 1316, and may be used by deployment system 1306, as described herein.

In at least one embodiment, a training pipeline may include a scenario where facility 1302 needs a machine learning model for use in performing one or more processing tasks for one or more applications in deployment system 1306, but facility 1302 may not currently have such a machine learning model (or may not have a model that is optimized, efficient, or effective for such purposes). In at least one embodiment, an existing machine learning model may be selected from a model registry 1324. In at least one embodiment, model registry 1324 may include machine learning models trained to perform a variety of different inference tasks on imaging data. In at least one embodiment, machine learning models in model registry 1324 may have been trained on imaging data from different facilities than facility 1302 (e.g., facilities remotely located). In at least one embodiment, machine learning models may have been trained on imaging data from one location, two locations, or any number of locations. In at least one embodiment, when being trained on imaging data from a specific location, training may take place at that location, or at least in a manner that protects confidentiality of imaging data or restricts imaging data from being transferred off-premises. In at least one embodiment, once a model is trained—or partially trained—at one location, a machine learning model may be added to model registry 1324. In at least one embodiment, a machine learning model may then be retrained, or updated, at any number of other facilities, and a retrained or updated model may be made available in model registry 1324. In at least one embodiment, a machine learning model may then be selected from model registry 1324—and referred to as output model 1316—and may be used in deployment system 1306 to perform one or more processing tasks for one or more applications of a deployment system.

In at least one embodiment, a scenario may include facility 1302 requiring a machine learning model for use in performing one or more processing tasks for one or more applications in deployment system 1306, but facility 1302 may not currently have such a machine learning model (or may not have a model that is optimized, efficient, or effective for such purposes). In at least one embodiment, a machine learning model selected from model registry 1324 may not be fine-tuned or optimized for imaging data 1308 generated at facility 1302 because of differences in populations, robustness of training data used to train a machine learning model, diversity in anomalies of training data, and/or other issues with training data. In at least one embodiment, AI-assisted annotation 1310 may be used to aid in generating annotations corresponding to imaging data 1308 to be used as ground truth data for retraining or updating a machine learning model. In at least one embodiment, labeled data 1312 may be used as ground truth data for training a machine learning model. In at least one embodiment, retraining or updating a machine learning model may be referred to as model training 1314. In at least one embodiment, model training 1314—e.g., AI-assisted annotations 1310, labeled clinic data 1312, or a combination thereof—may be used as ground truth data for retraining or updating a machine learning model. In at least one embodiment, a trained machine learning model may be referred to as output model 1316, and may be used by deployment system 1306, as described herein.

In at least one embodiment, deployment system 1306 may include software 1318, services 1320, hardware 1322, and/or other components, features, and functionality. In at least one embodiment, deployment system 1306 may include a software "stack," such that software 1318 may be built on top of services 1320 and may use services 1320 to perform some or all of processing tasks, and services 1320 and software 1318 may be built on top of hardware 1322 and use hardware 1322 to execute processing, storage, and/or other compute tasks of deployment system 1306. In at least one embodiment, software 1318 may include any number of different containers, where each container may execute an instantiation of an application. In at least one embodiment, each application may perform one or more processing tasks in an advanced processing and inferencing pipeline (e.g., inferencing, object detection, feature detection, segmentation, image enhancement, calibration, etc.). In at least one embodiment, an advanced processing and inferencing pipeline may be defined based on selections of different containers that are desired or required for processing imaging data 1308, in addition to containers that receive and configure imaging data for use by each container and/or for use by facility 1302 after processing through a pipeline (e.g., to convert outputs back to a usable data type). In at least one embodiment, a combination of containers within software 1318 (e.g., that make up a pipeline) may be referred to as a virtual instrument (as described in more detail herein), and a virtual instrument may leverage services 1320 and hardware 1322 to execute some or all processing tasks of applications instantiated in containers.

In at least one embodiment, a data processing pipeline may receive input data (e.g., imaging data 1308) in a specific format in response to an inference request (e.g., a request from a user of deployment system 1306). In at least one embodiment, input data may be representative of one or more images, video, and/or other data representations generated by one or more imaging devices. In at least one embodiment, data may undergo pre-processing as part of data processing pipeline to prepare data for processing by one or more applications. In at least one embodiment, post-processing may be performed on an output of one or more inferencing tasks or other processing tasks of a pipeline to prepare an output data for a next application and/or to prepare output data for transmission and/or use by a user (e.g., as a response to an inference request). In at least one embodiment, inferencing tasks may be performed by one or more machine learning models, such as trained or deployed neural networks, which may include output models 1316 of training system 1304.

In at least one embodiment, tasks of data processing pipeline may be encapsulated in a container(s) that each represents a discrete, fully functional instantiation of an application and virtualized computing environment that is able to reference machine learning models. In at least one embodiment, containers or applications may be published into a private (e.g., limited access) area of a container registry (described in more detail herein), and trained or deployed models may be stored in model registry 1324 and associated with one or more applications. In at least one embodiment, images of applications (e.g., container images) may be available in a container registry, and once selected by a user from a container registry for deployment in a pipeline, an image may be used to generate a container for an instantiation of an application for use by a user's system.

In at least one embodiment, developers (e.g., software developers, clinicians, doctors, etc.) may develop, publish, and store applications (e.g., as containers) for performing image processing and/or inferencing on supplied data. In at least one embodiment, development, publishing, and/or storing may be performed using a software development kit (SDK) associated with a system (e.g., to ensure that an application and/or container developed is compliant with or compatible with a system). In at least one embodiment, an application that is developed may be tested locally (e.g., at a first facility, on data from a first facility) with an SDK which may support at least some of services 1320 as a system (e.g., system 1200 of FIG. 12). In at least one embodiment, because DICOM objects may contain anywhere from one to hundreds of images or other data types, and due to a variation in data, a developer may be responsible for managing (e.g., setting constructs for, building pre-processing into an application, etc.) extraction and preparation of incoming data. In at least one embodiment, once validated by system 1300 (e.g., for accuracy), an application may be available in a container registry for selection and/or implementation by a user to perform one or more processing tasks with respect to data at a facility (e.g., a second facility) of a user.

In at least one embodiment, developers may then share applications or containers through a network for access and use by users of a system (e.g., system 1300 of FIG. 13). In at least one embodiment, completed and validated applications or containers may be stored in a container registry and associated machine learning models may be stored in model registry 1324. In at least one embodiment, a requesting entity—who provides an inference or image processing request—may browse a container registry and/or model registry 1324 for an application, container, dataset, machine learning model, etc., select a desired combination of elements for inclusion in data processing pipeline, and submit an imaging processing request. In at least one embodiment, a request may include input data (and associated patient data, in some examples) that is necessary to perform a request, and/or may include a selection of application(s) and/or machine learning models to be executed in processing a request. In at least one embodiment, a request may then be passed to one or more components of deployment system 1306 (e.g., a cloud) to perform processing of data processing pipeline. In at least one embodiment, processing by deployment system 1306 may include referencing selected elements (e.g., applications, containers, models, etc.) from a container registry and/or model registry 1324. In at least one embodiment, once results are generated by a pipeline, results may be returned to a user for reference (e.g., for viewing in a viewing application suite executing on a local, on-premises workstation or terminal).

In at least one embodiment, to aid in processing or execution of applications or containers in pipelines, services 1320 may be leveraged. In at least one embodiment, services 1320 may include compute services, artificial intelligence (AI) services, visualization services, and/or other service types. In at least one embodiment, services 1320 may provide functionality that is common to one or more applications in software 1318, so functionality may be abstracted to a service that may be called upon or leveraged by applications. In at least one embodiment, functionality provided by services 1320 may run dynamically and more efficiently, while also scaling well by allowing applications to process data in parallel (e.g., using a parallel computing platform 1230 (FIG. 12)). In at least one embodiment, rather than each application that shares a same functionality offered by a service 1320 being required to have a respective instance of service 1320, service 1320 may be shared between and among various applications. In at least one embodiment, services may include an inference server or engine that may be used for executing detection or segmentation tasks, as non-limiting examples. In at least one embodiment, a model training service may be included that may provide machine learning model training and/or retraining capabilities. In at least one embodiment, a data augmentation service may further be included that may provide GPU accelerated data (e.g., DICOM, RIS, CIS, REST compliant, RPC, raw, etc.) extraction, resizing, scaling, and/or other augmentation. In at least one embodiment, a visualization service may be used that may add image rendering effects—such as ray-tracing, rasterization, denoising, sharpening, etc.—to add realism to two-dimensional (2D) and/or three-dimensional (3D) models. In at least one embodiment, virtual instrument services may be included that provide for beam-forming, segmentation, inferencing, imaging, and/or support for other applications within pipelines of virtual instruments.

In at least one embodiment, where a service 1320 includes an AI service (e.g., an inference service), one or more machine learning models may be executed by calling upon (e.g., as an API call) an inference service (e.g., an inference server) to execute machine learning model(s), or processing thereof, as part of application execution. In at least one embodiment, where another application includes one or more machine learning models for segmentation tasks, an application may call upon an inference service to execute machine learning models for performing one or more of processing operations associated with segmentation tasks. In at least one embodiment, software 1318 implementing advanced processing and inferencing pipeline that includes segmentation application and anomaly detection application may be streamlined because each application may call upon a same inference service to perform one or more inferencing tasks.

In at least one embodiment, hardware 1322 may include GPUs, CPUs, graphics cards, an AI/deep learning system (e.g., an AI supercomputer, such as NVIDIA's DGX), a cloud platform, or a combination thereof. In at least one embodiment, different types of hardware 1322 may be used to provide efficient, purpose-built support for software 1318 and services 1320 in deployment system 1306. In at least one embodiment, use of GPU processing may be implemented for processing locally (e.g., at facility 1302), within an AI/deep learning system, in a cloud system, and/or in other processing components of deployment system 1306 to improve efficiency, accuracy, and efficacy of image processing and generation. In at least one embodiment, software 1318 and/or services 1320 may be optimized for GPU processing with respect to deep learning, machine learning, and/or high-performance computing, as non-limiting examples. In at least one embodiment, at least some of computing environment of deployment system 1306 and/or training system 1304 may be executed in a datacenter one or more supercomputers or high performance computing systems, with GPU optimized software (e.g., hardware and software combination of NVIDIA's DGX System). In at least one embodiment, hardware 1322 may include any number of GPUs that may be called upon to perform processing of data in parallel, as described herein. In at least one embodiment, cloud platform may further include GPU processing for GPU-optimized execution of deep learning tasks, machine learning tasks, or other computing tasks. In at least one embodiment, cloud platform (e.g., NVIDIA's NGC) may be executed using an AI/deep learning supercomputer(s) and/or GPU-optimized software (e.g., as provided on NVIDIA's DGX Systems) as a hardware abstraction and scaling platform. In at least one embodiment, cloud platform may integrate an application container clustering system or orchestration system (e.g., KUBERNETES) on multiple GPUs to enable seamless scaling and load balancing.

Figure 14:
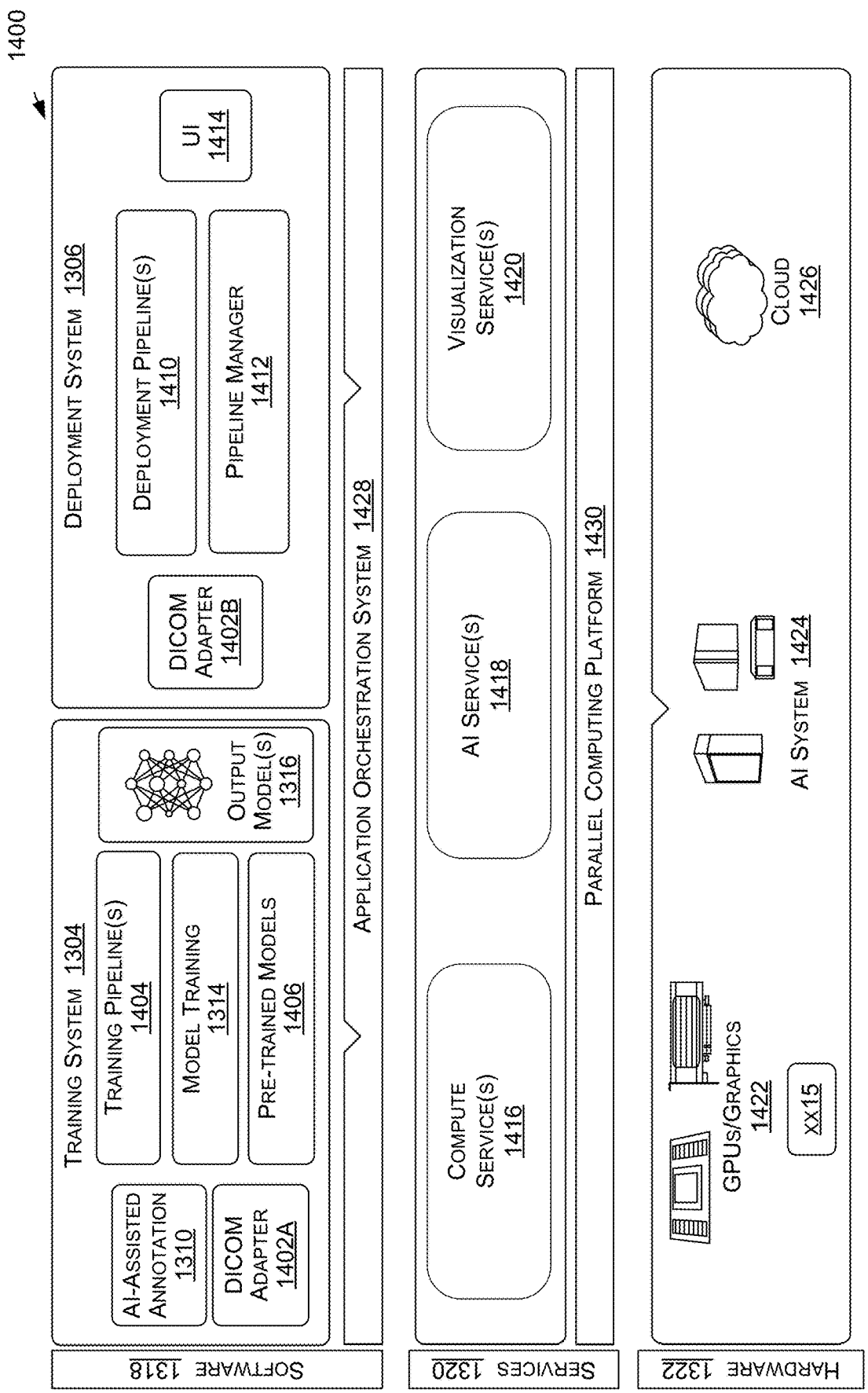
FIG. 14 is a system diagram for an example system for training, adapting, instantiating and deploying machine learning models in an advanced computing pipeline, in accordance with at least one embodiment.

FIG. 14 is a system diagram for an example system 1400 for generating and deploying an imaging deployment pipeline, in accordance with at least one embodiment. In at least one embodiment, system 1400 may be used to implement process 1300 of FIG. 13 and/or other processes including advanced processing and inferencing pipelines. In at least one embodiment, system 1400 may include training system 1304 and deployment system 1306. In at least one embodiment, training system 1304 and deployment system 1306 may be implemented using software 1318, services 1320, and/or hardware 1322, as described herein.

In at least one embodiment, system 1400 (e.g., training system 1304 and/or deployment system 1306) may implemented in a cloud computing environment (e.g., using cloud 1426). In at least one embodiment, system 1400 may be implemented locally with respect to a healthcare services facility, or as a combination of both cloud and local computing resources. In at least one embodiment, access to APIs in cloud 1426 may be restricted to authorized users through enacted security measures or protocols. In at least one embodiment, a security protocol may include web tokens that may be signed by an authentication (e.g., AuthN, AuthZ, Gluecon, etc.) service and may carry appropriate authorization. In at least one embodiment, APIs of virtual instruments (described herein), or other instantiations of system 1400, may be restricted to a set of public IPs that have been vetted or authorized for interaction.

In at least one embodiment, various components of system 1400 may communicate between and among one another using any of a variety of different network types, including but not limited to local area networks (LANs) and/or wide area networks (WANs) via wired and/or wireless communication protocols. In at least one embodiment, communication between facilities and components of system 1400 (e.g., for transmitting inference requests, for receiving results of inference requests, etc.) may be communicated over data bus(ses), wireless data protocols (Wi-Fi), wired data protocols (e.g., Ethernet), etc.

In at least one embodiment, training system 1304 may execute training pipelines 1404, similar to those described herein with respect to FIG. 13. In at least one embodiment, where one or more machine learning models are to be used in deployment pipelines 1410 by deployment system 1306, training pipelines 1404 may be used to train or retrain one or more (e.g. pre-trained) models, and/or implement one or more of pre-trained models 1406 (e.g., without a need for retraining or updating). In at least one embodiment, as a result of training pipelines 1404, output model(s) 1316 may be generated. In at least one embodiment, training pipelines 1404 may include any number of processing steps, such as but not limited to imaging data (or other input data) conversion or adaption In at least one embodiment, for different machine learning models used by deployment system 1306, different training pipelines 1404 may be used. In at least one embodiment, training pipeline 1404 similar to a first example described with respect to FIG. 13 may be used for a first machine learning model, training pipeline 1404 similar to a second example described with respect to FIG. 13 may be used for a second machine learning model, and training pipeline 1404 similar to a third example described with respect to FIG. 13 may be used for a third machine learning model. In at least one embodiment, any combination of tasks within training system 1304 may be used depending on what is required for each respective machine learning model. In at least one embodiment, one or more of machine learning models may already be trained and ready for deployment so machine learning models may not undergo any processing by training system 1304, and may be implemented by deployment system 1306.

In at least one embodiment, output model(s) 1316 and/or pre-trained model(s) 1406 may include any types of machine learning models depending on implementation or embodiment. In at least one embodiment, and without limitation, machine learning models used by system 1400 may include machine learning model(s) using linear regression, logistic regression, decision trees, support vector machines (SVM), Naïve Bayes, k-nearest neighbor (Knn), K means clustering, random forest, dimensionality reduction algorithms, gradient boosting algorithms, neural networks (e.g., auto-encoders, convolutional, recurrent, perceptrons, Long/Short Term Memory (LSTM), Hopfield, Boltzmann, deep belief, deconvolutional, generative adversarial, liquid state machine, etc.), and/or other types of machine learning models.

In at least one embodiment, training pipelines 1404 may include AI-assisted annotation, as described in more detail herein with respect to at least FIG. 14B. In at least one embodiment, labeled data 1312 (e.g., traditional annotation) may be generated by any number of techniques. In at least one embodiment, labels or other annotations may be generated within a drawing program (e.g., an annotation program), a computer aided design (CAD) program, a labeling program, another type of program suitable for generating annotations or labels for ground truth, and/or may be hand drawn, in some examples. In at least one embodiment, ground truth data may be synthetically produced (e.g., generated from computer models or renderings), real produced (e.g., designed and produced from real-world data), machine-automated (e.g., using feature analysis and learning to extract features from data and then generate labels), human annotated (e.g., labeler, or annotation expert, defines location of labels), and/or a combination thereof. In at least one embodiment, for each instance of imaging data 1308 (or other data type used by machine learning models), there may be corresponding ground truth data generated by training system 1304. In at least one embodiment, AI-assisted annotation may be performed as part of deployment pipelines 1410; either in addition to, or in lieu of AI-assisted annotation included in training pipelines 1404. In at least one embodiment, system 1400 may include a multi-layer platform that may include a software layer (e.g., software 1318) of diagnostic applications (or other application types) that may perform one or more medical imaging and diagnostic functions. In at least one embodiment, system 1400 may be communicatively coupled to (e.g., via encrypted links) PACS server networks of one or more facilities. In at least one embodiment, system 1400 may be configured to access and referenced data from PACS servers to perform operations, such as training machine learning models, deploying machine learning models, image processing, inferencing, and/or other operations.

In at least one embodiment, a software layer may be implemented as a secure, encrypted, and/or authenticated API through which applications or containers may be invoked (e.g., called) from an external environment(s) (e.g., facility 1302). In at least one embodiment, applications may then call or execute one or more services 1320 for performing compute, AI, or visualization tasks associated with respective applications, and software 1318 and/or services 1320 may leverage hardware 1322 to perform processing tasks in an effective and efficient manner.

In at least one embodiment, deployment system 1306 may execute deployment pipelines 1410. In at least one embodiment, deployment pipelines 1410 may include any number of applications that may be sequentially, non-sequentially, or otherwise applied to imaging data (and/or other data types) generated by imaging devices, sequencing devices, genomics devices, etc.—including AI-assisted annotation, as described above. In at least one embodiment, as described herein, a deployment pipeline 1410 for an individual device may be referred to as a virtual instrument for a device (e.g., a virtual ultrasound instrument, a virtual CT scan instrument, a virtual sequencing instrument, etc.). In at least one embodiment, for a single device, there may be more than one deployment pipeline 1410 depending on information desired from data generated by a device. In at least one embodiment, where detections of anomalies are desired from an Mill machine, there may be a first deployment pipeline 1410, and where image enhancement is desired from output of an Mill machine, there may be a second deployment pipeline 1410.

In at least one embodiment, an image generation application may include a processing task that includes use of a machine learning model. In at least one embodiment, a user may desire to use their own machine learning model, or to select a machine learning model from model registry 1324. In at least one embodiment, a user may implement their own machine learning model or select a machine learning model for inclusion in an application for performing a processing task. In at least one embodiment, applications may be selectable and customizable, and by defining constructs of applications, deployment and implementation of applications for a particular user are presented as a more seamless user experience. In at least one embodiment, by leveraging other features of system 1400—such as services 1320 and hardware 1322—deployment pipelines 1410 may be even more user friendly, provide for easier integration, and produce more accurate, efficient, and timely results.

In at least one embodiment, deployment system 1306 may include a user interface 1413 (e.g., a graphical user interface, a web interface, etc.) that may be used to select applications for inclusion in deployment pipeline(s) 1410, arrange applications, modify or change applications or parameters or constructs thereof, use and interact with deployment pipeline(s) 1410 during set-up and/or deployment, and/or to otherwise interact with deployment system 1306. In at least one embodiment, although not illustrated with respect to training system 1304, user interface 1414 (or a different user interface) may be used for selecting models for use in deployment system 1306, for selecting models for training, or retraining, in training system 1304, and/or for otherwise interacting with training system 1304.

In at least one embodiment, pipeline manager 1412 may be used, in addition to an application orchestration system 1428, to manage interaction between applications or containers of deployment pipeline(s) 1410 and services 1320 and/or hardware 1322. In at least one embodiment, pipeline manager 1412 may be configured to facilitate interactions from application to application, from application to service 1320, and/or from application or service to hardware 1322. In at least one embodiment, although illustrated as included in software 1318, this is not intended to be limiting, and in some examples pipeline manager 1412 may be included in services 1320. In at least one embodiment, application orchestration system 1428 (e.g., Kubernetes, DOCKER, etc.) may include a container orchestration system that may group applications into containers as logical units for coordination, management, scaling, and deployment. In at least one embodiment, by associating applications from deployment pipeline(s) 1410 (e.g., a reconstruction application, a segmentation application, etc.) with individual containers, each application may execute in a self-contained environment (e.g., at a kernel level) to increase speed and efficiency.

In at least one embodiment, each application and/or container (or image thereof) may be individually developed, modified, and deployed (e.g., a first user or developer may develop, modify, and deploy a first application and a second user or developer may develop, modify, and deploy a second application separate from a first user or developer), which may allow for focus on, and attention to, a task of a single application and/or container(s) without being hindered by tasks of another application(s) or container(s). In at least one embodiment, communication, and cooperation between different containers or applications may be aided by pipeline manager 1412 and application orchestration system 1428. In at least one embodiment, so long as an expected input and/or output of each container or application is known by a system (e.g., based on constructs of applications or containers), application orchestration system 1428 and/or pipeline manager 1412 may facilitate communication among and between, and sharing of resources among and between, each of applications or containers. In at least one embodiment, because one or more of applications or containers in deployment pipeline(s) 1410 may share same services and resources, application orchestration system 1428 may orchestrate, load balance, and determine sharing of services or resources between and among various applications or containers. In at least one embodiment, a scheduler may be used to track resource requirements of applications or containers, current usage or planned usage of these resources, and resource availability. In at least one embodiment, a scheduler may thus allocate resources to different applications and distribute resources between and among applications in view of requirements and availability of a system. In some examples, a scheduler (and/or other component of application orchestration system 1428) may determine resource availability and distribution based on constraints imposed on a system (e.g., user constraints), such as quality of service (QoS), urgency of need for data outputs (e.g., to determine whether to execute real-time processing or delayed processing), etc.

In at least one embodiment, services 1320 leveraged by and shared by applications or containers in deployment system 1306 may include compute services 1416, AI services 1418, visualization services 1420, and/or other service types. In at least one embodiment, applications may call (e.g., execute) one or more of services 1320 to perform processing operations for an application. In at least one embodiment, compute services 1416 may be leveraged by applications to perform super-computing or other high-performance computing (HPC) tasks. In at least one embodiment, compute service(s) 1416 may be leveraged to perform parallel processing (e.g., using a parallel computing platform 1430) for processing data through one or more of applications and/or one or more tasks of a single application, substantially simultaneously. In at least one embodiment, parallel computing platform 1430 (e.g., NVIDIA's CUDA) may enable general purpose computing on GPUs (GPGPU) (e.g., GPUs 1422). In at least one embodiment, a software layer of parallel computing platform 1430 may provide access to virtual instruction sets and parallel computational elements of GPUs, for execution of compute kernels. In at least one embodiment, parallel computing platform 1430 may include memory and, in some embodiments, a memory may be shared between and among multiple containers, and/or between and among different processing tasks within a single container. In at least one embodiment, inter-process communication (IPC) calls may be generated for multiple containers and/or for multiple processes within a container to use same data from a shared segment of memory of parallel computing platform 1430 (e.g., where multiple different stages of an application or multiple applications are processing same information). In at least one embodiment, rather than making a copy of data and moving data to different locations in memory (e.g., a read/write operation), same data in same location of a memory may be used for any number of processing tasks (e.g., at a same time, at different times, etc.). In at least one embodiment, as data is used to generate new data as a result of processing, this information of a new location of data may be stored and shared between various applications. In at least one embodiment, location of data and a location of updated or modified data may be part of a definition of how a payload is understood within containers.

In at least one embodiment, AI services 1418 may be leveraged to perform inferencing services for executing machine learning model(s) associated with applications (e.g., tasked with performing one or more processing tasks of an application). In at least one embodiment, AI services 1418 may leverage AI system 1424 to execute machine learning model(s) (e.g., neural networks, such as CNNs) for segmentation, reconstruction, object detection, feature detection, classification, and/or other inferencing tasks. In at least one embodiment, applications of deployment pipeline(s) 1410 may use one or more of output models 1316 from training system 1304 and/or other models of applications to perform inference on imaging data. In at least one embodiment, two or more examples of inferencing using application orchestration system 1428 (e.g., a scheduler) may be available. In at least one embodiment, a first category may include a high priority/low latency path that may achieve higher service level agreements, such as for performing inference on urgent requests during an emergency, or for a radiologist during diagnosis. In at least one embodiment, a second category may include a standard priority path that may be used for requests that may be non-urgent or where analysis may be performed at a later time. In at least one embodiment, application orchestration system 1428 may distribute resources (e.g., services 1320 and/or hardware 1322) based on priority paths for different inferencing tasks of AI services 1418.

In at least one embodiment, shared storage may be mounted to AI services 1418 within system 1400. In at least one embodiment, shared storage may operate as a cache (or other storage device type) and may be used to process inference requests from applications. In at least one embodiment, when an inference request is submitted, a request may be received by a set of API instances of deployment system 1306, and one or more instances may be selected (e.g., for best fit, for load balancing, etc.) to process a request. In at least one embodiment, to process a request, a request may be entered into a database, a machine learning model may be located from model registry 1324 if not already in a cache, a validation step may ensure appropriate machine learning model is loaded into a cache (e.g., shared storage), and/or a copy of a model may be saved to a cache. In at least one embodiment, a scheduler (e.g., of pipeline manager 1412) may be used to launch an application that is referenced in a request if an application is not already running or if there are not enough instances of an application. In at least one embodiment, if an inference server is not already launched to execute a model, an inference server may be launched. Any number of inference servers may be launched per model. In at least one embodiment, in a pull model, in which inference servers are clustered, models may be cached whenever load balancing is advantageous. In at least one embodiment, inference servers may be statically loaded in corresponding, distributed servers.

In at least one embodiment, inferencing may be performed using an inference server that runs in a container. In at least one embodiment, an instance of an inference server may be associated with a model (and optionally a plurality of versions of a model). In at least one embodiment, if an instance of an inference server does not exist when a request to perform inference on a model is received, a new instance may be loaded. In at least one embodiment, when starting an inference server, a model may be passed to an inference server such that a same container may be used to serve different models so long as inference server is running as a different instance.

In at least one embodiment, during application execution, an inference request for a given application may be received, and a container (e.g., hosting an instance of an inference server) may be loaded (if not already), and a start procedure may be called. In at least one embodiment, pre-processing logic in a container may load, decode, and/or perform any additional pre-processing on incoming data (e.g., using a CPU(s) and/or GPU(s)). In at least one embodiment, once data is prepared for inference, a container may perform inference as necessary on data. In at least one embodiment, this may include a single inference call on one image (e.g., a hand X-ray), or may require inference on hundreds of images (e.g., a chest CT). In at least one embodiment, an application may summarize results before completing, which may include, without limitation, a single confidence score, pixel level-segmentation, voxel-level segmentation, generating a visualization, or generating text to summarize findings. In at least one embodiment, different models or applications may be assigned different priorities. For example, some models may have a real-time (TAT<1 min) priority while others may have lower priority (e.g., TAT<10 min). In at least one embodiment, model execution times may be measured from requesting institution or entity and may include partner network traversal time, as well as execution on an inference service.

In at least one embodiment, transfer of requests between services 1320 and inference applications may be hidden behind a software development kit (SDK), and robust transport may be provide through a queue. In at least one embodiment, a request will be placed in a queue via an API for an individual application/tenant ID combination and an SDK will pull a request from a queue and give a request to an application. In at least one embodiment, a name of a queue may be provided in an environment from where an SDK will pick it up. In at least one embodiment, asynchronous communication through a queue may be useful as it may allow any instance of an application to pick up work as it becomes available. Results may be transferred back through a queue, to ensure no data is lost. In at least one embodiment, queues may also provide an ability to segment work, as highest priority work may go to a queue with most instances of an application connected to it, while lowest priority work may go to a queue with a single instance connected to it that processes tasks in an order received. In at least one embodiment, an application may run on a GPU-accelerated instance generated in cloud 1426, and an inference service may perform inferencing on a GPU.

In at least one embodiment, visualization services 1420 may be leveraged to generate visualizations for viewing outputs of applications and/or deployment pipeline(s) 1410. In at least one embodiment, GPUs 1422 may be leveraged by visualization services 1420 to generate visualizations. In at least one embodiment, rendering effects, such as ray-tracing, may be implemented by visualization services 1420 to generate higher quality visualizations. In at least one embodiment, visualizations may include, without limitation, 2D image renderings, 3D volume renderings, 3D volume reconstruction, 2D tomographic slices, virtual reality displays, augmented reality displays, etc. In at least one embodiment, virtualized environments may be used to generate a virtual interactive display or environment (e.g., a virtual environment) for interaction by users of a system (e.g., doctors, nurses, radiologists, etc.). In at least one embodiment, visualization services 1420 may include an internal visualizer, cinematics, and/or other rendering or image processing capabilities or functionality (e.g., ray tracing, rasterization, internal optics, etc.).

In at least one embodiment, hardware 1322 may include GPUs 1422, AI system 1424, cloud 1426, and/or any other hardware used for executing training system 1304 and/or deployment system 1306. In at least one embodiment, GPUs 1422 (e.g., NVIDIA's TESLA and/or QUADRO GPUs) may include any number of GPUs that may be used for executing processing tasks of compute services 1416, AI services 1418, visualization services 1420, other services, and/or any of features or functionality of software 1318. For example, with respect to AI services 1418, GPUs 1422 may be used to perform pre-processing on imaging data (or other data types used by machine learning models), post-processing on outputs of machine learning models, and/or to perform inferencing (e.g., to execute machine learning models). In at least one embodiment, cloud 1426, AI system 1424, and/or other components of system 1400 may use GPUs 1422. In at least one embodiment, cloud 1426 may include a GPU-optimized platform for deep learning tasks. In at least one embodiment, AI system 1424 may use GPUs, and cloud 1426—or at least a portion tasked with deep learning or inferencing—may be executed using one or more AI systems 1424. As such, although hardware 1322 is illustrated as discrete components, this is not intended to be limiting, and any components of hardware 1322 may be combined with, or leveraged by, any other components of hardware 1322.

In at least one embodiment, AI system 1424 may include a purpose-built computing system (e.g., a super-computer or an HPC) configured for inferencing, deep learning, machine learning, and/or other artificial intelligence tasks. In at least one embodiment, AI system 1424 (e.g., NVIDIA's DGX) may include GPU-optimized software (e.g., a software stack) that may be executed using a plurality of GPUs 1422, in addition to CPUs, RAM, storage, and/or other components, features, or functionality. In at least one embodiment, one or more AI systems 1424 may be implemented in cloud 1426 (e.g., in a data center) for performing some or all of AI-based processing tasks of system 1400.

In at least one embodiment, cloud 1426 may include a GPU-accelerated infrastructure (e.g., NVIDIA's NGC) that may provide a GPU-optimized platform for executing processing tasks of system 1400. In at least one embodiment, cloud 1426 may include an AI system(s) 1424 for performing one or more of AI-based tasks of system 1400 (e.g., as a hardware abstraction and scaling platform). In at least one embodiment, cloud 1426 may integrate with application orchestration system 1428 leveraging multiple GPUs to enable seamless scaling and load balancing between and among applications and services 1320. In at least one embodiment, cloud 1426 may tasked with executing at least some of services 1320 of system 1400, including compute services 1416, AI services 1418, and/or visualization services 1420, as described herein. In at least one embodiment, cloud 1426 may perform small and large batch inference (e.g., executing NVIDIA's TENSOR RT), provide an accelerated parallel computing API and platform 1430 (e.g., NVIDIA's CUDA), execute application orchestration system 1428 (e.g., KUBERNETES), provide a graphics rendering API and platform (e.g., for ray-tracing, 2D graphics, 3D graphics, and/or other rendering techniques to produce higher quality cinematics), and/or may provide other functionality for system 1400.

Figure 15A:
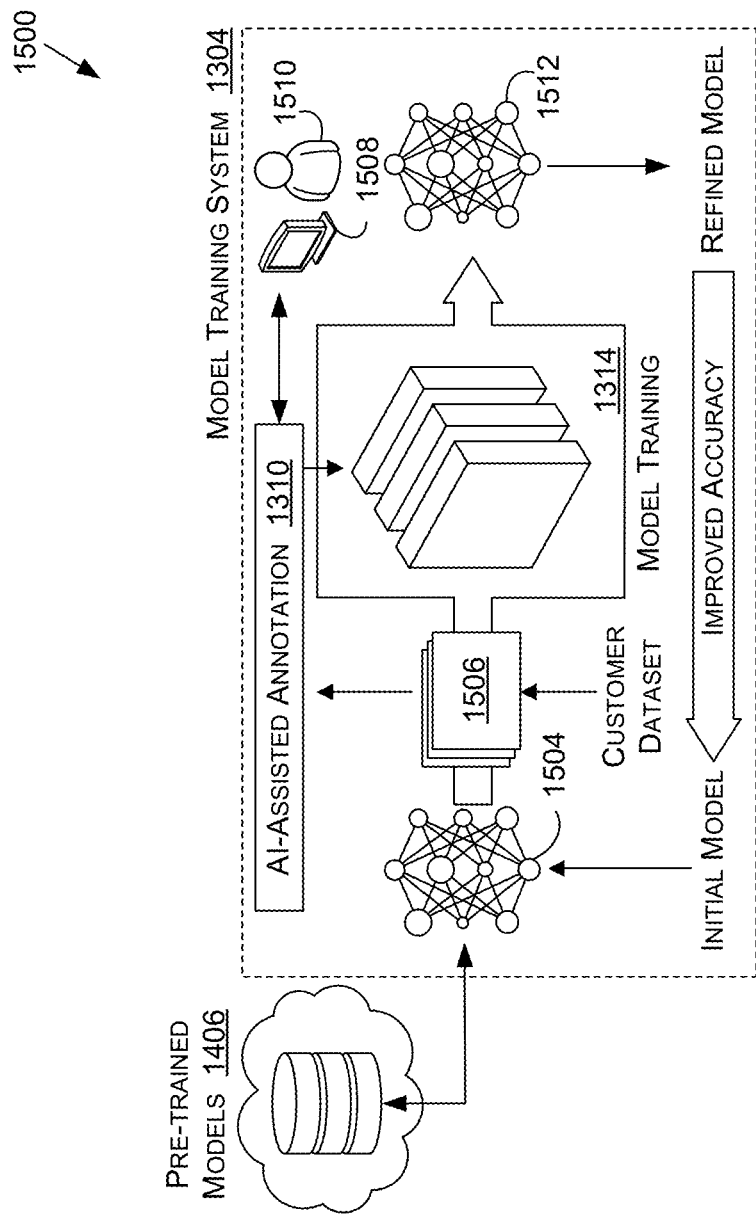

FIG. 15A illustrates a data flow diagram for a process 1500 to train, retrain, or update a machine learning model, in accordance with at least one embodiment. In at least one embodiment, process 1500 may be executed using, as a non-limiting example, system 1500 of FIG. 15. In at least one embodiment, process 1500 may leverage services and/or hardware as described herein. In at least one embodiment, refined models 1512 generated by process 1500 may be executed by a deployment system for one or more containerized applications in deployment pipelines.

In at least one embodiment, model training 1514 may include retraining or updating an initial model 1504 (e.g., a pre-trained model) using new training data (e.g., new input data, such as customer dataset 1506, and/or new ground truth data associated with input data). In at least one embodiment, to retrain, or update, initial model 1504, output or loss layer(s) of initial model 1504 may be reset, or deleted, and/or replaced with an updated or new output or loss layer(s). In at least one embodiment, initial model 1504 may have previously fine-tuned parameters (e.g., weights and/or biases) that remain from prior training, so training or retraining 1514 may not take as long or require as much processing as training a model from scratch. In at least one embodiment, during model training 1514, by having reset or replaced output or loss layer(s) of initial model 1504, parameters may be updated and re-tuned for a new data set based on loss calculations associated with accuracy of output or loss layer(s) at generating predictions on new, customer dataset 1506.

In at least one embodiment, pre-trained models 1506 may be stored in a data store, or registry. In at least one embodiment, pre-trained models 1506 may have been trained, at least in part, at one or more facilities other than a facility executing process 1500. In at least one embodiment, to protect privacy and rights of patients, subjects, or clients of different facilities, pre-trained models 1506 may have been trained, on-premise, using customer or patient data generated on-premise. In at least one embodiment, pre-trained models 1306 may be trained using a cloud and/or other hardware, but confidential, privacy protected patient data may not be transferred to, used by, or accessible to any components of a cloud (or other off premise hardware). In at least one embodiment, where a pre-trained model 1506 is trained at using patient data from more than one facility, pre-trained model 1506 may have been individually trained for each facility prior to being trained on patient or customer data from another facility. In at least one embodiment, such as where a customer or patient data has been released of privacy concerns (e.g., by waiver, for experimental use, etc.), or where a customer or patient data is included in a public data set, a customer or patient data from any number of facilities may be used to train pre-trained model 1506 on-premise and/or off premise, such as in a datacenter or other cloud computing infrastructure.

In at least one embodiment, when selecting applications for use in deployment pipelines, a user may also select machine learning models to be used for specific applications. In at least one embodiment, a user may not have a model for use, so a user may select a pre-trained model to use with an application. In at least one embodiment, pre-trained model may not be optimized for generating accurate results on customer dataset 1506 of a facility of a user (e.g., based on patient diversity, demographics, types of medical imaging devices used, etc.). In at least one embodiment, prior to deploying a pre-trained model into a deployment pipeline for use with an application(s), pre-trained model may be updated, retrained, and/or fine-tuned for use at a respective facility.

In at least one embodiment, a user may select pre-trained model that is to be updated, retrained, and/or fine-tuned, and this pre-trained model may be referred to as initial model 1504 for a training system within process 1500. In at least one embodiment, a customer dataset 1506 (e.g., imaging data, genomics data, sequencing data, or other data types generated by devices at a facility) may be used to perform model training (which may include, without limitation, transfer learning) on initial model 1504 to generate refined model 1512. In at least one embodiment, ground truth data corresponding to customer dataset 1506 may be generated by training system 1304. In at least one embodiment, ground truth data may be generated, at least in part, by clinicians, scientists, doctors, practitioners, at a facility.

In at least one embodiment, AI-assisted annotation may be used in some examples to generate ground truth data. In at least one embodiment, AI-assisted annotation (e.g., implemented using an AI-assisted annotation SDK) may leverage machine learning models (e.g., neural networks) to generate suggested or predicted ground truth data for a customer dataset. In at least one embodiment, a user may use annotation tools within a user interface (a graphical user interface (GUI)) on a computing device.

In at least one embodiment, user 1510 may interact with a GUI via computing device 1508 to edit or fine-tune (auto)annotations. In at least one embodiment, a polygon editing feature may be used to move vertices of a polygon to more accurate or fine-tuned locations.

In at least one embodiment, once customer dataset 1506 has associated ground truth data, ground truth data (e.g., from AI-assisted annotation, manual labeling, etc.) may be used by during model training to generate refined model 1512. In at least one embodiment, customer dataset 1506 may be applied to initial model 1504 any number of times, and ground truth data may be used to update parameters of initial model 1504 until an acceptable level of accuracy is attained for refined model 1512. In at least one embodiment, once refined model 1512 is generated, refined model 1512 may be deployed within one or more deployment pipelines at a facility for performing one or more processing tasks with respect to medical imaging data.

In at least one embodiment, refined model 1512 may be uploaded to pre-trained models in a model registry to be selected by another facility. In at least one embodiment, his process may be completed at any number of facilities such that refined model 1512 may be further refined on new datasets any number of times to generate a more universal model.

FIG. 15B is an example illustration of a client-server architecture 1532 to enhance annotation tools with pre-trained annotation models, in accordance with at least one embodiment. In at least one embodiment, AI-assisted annotation tools 1536 may be instantiated based on a client-server architecture 1532. In at least one embodiment, annotation tools 1536 in imaging applications may aid radiologists, for example, identify organs and abnormalities. In at least one embodiment, imaging applications may include software tools that help user 1510 to identify, as a non-limiting example, a few extreme points on a particular organ of interest in raw images 1534 (e.g., in a 3D MRI or CT scan) and receive auto-annotated results for all 2D slices of a particular organ. In at least one embodiment, results may be stored in a data store as training data 1538 and used as (for example and without limitation) ground truth data for training. In at least one embodiment, when computing device 1508 sends extreme points for AI-assisted annotation, a deep learning model, for example, may receive this data as input and return inference results of a segmented organ or abnormality. In at least one embodiment, pre-instantiated annotation tools, such as AI-Assisted Annotation Tool 1536B in FIG. 15B, may be enhanced by making API calls (e.g., API Call 1544) to a server, such as an Annotation Assistant Server 1540 that may include a set of pre-trained models 1542 stored in an annotation model registry, for example. In at least one embodiment, an annotation model registry may store pre-trained models 1542 (e.g., machine learning models, such as deep learning models) that are pre-trained to perform AI-assisted annotation on a particular organ or abnormality. These models may be further updated by using training pipelines. In at least one embodiment, pre-installed annotation tools may be improved over time as new labeled data is added.

Various embodiments can be described by the following clauses:

1. A computer-implemented method, comprising:
    obtaining a three-dimensional (3D) representation of a first object;
    generating one or more feature encodings corresponding to the 3D representation;
    mapping coordinates of the 3D representation to a two-dimensional (2D) texture space; generating, based in part on the mapped coordinates in the 2D texture space and the one or more feature encodings, a 2D texture image corresponding to the input 3D representation of the first object; and deforming the 2D texture image to correspond to 3D geometry of a second object.

2. The computer-implemented method of claim 1, wherein the 3D representation of the first object is a point cloud comprising points with color data.

3. The computer-implemented method of claim 1, wherein the one or more feature encodings include a first texture feature vector corresponding to a first portion of the first object, a second texture feature vector corresponding to a second portion of the first object, and a shape code vector generated by an encoder network receiving at least the 3D representation of the first object as input.

4. The computer-implemented method of claim 3, further comprising:
    providing the mapped coordinates in the 2D texture space as input to a first basis generator network, to generate a first texture basis, and a second basis generator network to generate a second texture basis.

5. The computer-implemented method of claim 4, further comprising:
    generating a first texture image using point color data determined based in part on the first texture basis and the first texture feature vector; and generating a second texture image using point cloud color data determined based in part on the second texture basis and the second texture feature vector.

6. The computer-implemented method of claim 5, further comprising:
    segmenting surface points of the 3D representation of the first object to generate a first mask, corresponding to the first portion of the first object, and a second mask corresponding to the second portion of the first object; and
    using the first mask and the second mask with the first texture image and the second texture image to generate a masked combination of color values for coordinates of the second object.

7. The computer-implemented method of claim 1, wherein the 3D representation of the first object is segmented into a plurality of voxels before the one or more feature encodings are generated by an encoding network.

8. The computer-implemented method of claim 1, wherein the target object is a different object from the first object, or the first object in a different pose or state.

9. The computer-implemented method of claim 1, wherein the one or more feature encodings corresponding to the first object include semantic information for the object.

10. A processor, comprising:
    one or more circuits to:
    obtain a three-dimensional (3D) representation of a first object;
    generate one or more feature encodings corresponding to the 3D representation;
    map coordinates of the 3D representation to a two-dimensional (2D) texture space;
    generate, based in part on the mapped coordinates in the 2D texture space and the one or more feature encodings, a 2D texture image corresponding to the input 3D representation of the first object; and deform the 2D texture image to correspond to 3D geometry of a second object.

11. The processor of claim 10, wherein the one or more feature encodings include a first texture feature vector corresponding to a first portion of the first object, a second texture feature vector corresponding to a second portion of the first object, and a shape code vector generated by an encoder network receiving at least the 3D representation of the first object as input.

12. The processor of claim 11, wherein the one or more circuits are to perform operations further to:
provide the mapped coordinates in the 2D texture space as input to a first basis generator network, to generate a first texture basis, and a second basis generator network to generate a second texture basis.

13. The processor of claim 12, wherein the one or more circuits are to perform operations further to:
generate a first texture image using point color data determined based in part on the first texture basis and the first texture feature vector; and
generate a second texture image using point cloud color data determined based in part on the second texture basis and the second texture feature vector.

14. The processor of claim 13, wherein the one or more circuits are to perform operations further to:
segment surface points of the 3D representation of the first object to generate a first mask, corresponding to the first portion of the first object, and a second mask corresponding to the second portion of the first object; and
use the first mask and the second mask with the first texture image and the second texture image to generate a masked combination of color values for coordinates of the second object.

15. The processor of claim 10, wherein the processor is comprised in at least one of: a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

16. A system, comprising:
one or more processors to use a neural network to deform at least one 2D texture image of a first object to correspond to a 3D geometry of a second object, the one or more processors further to generate the at least one 2D texture image based in part on mapped coordinates of a 3D representation of the first object in 2D texture space, and one or more feature encodings extracted from the 3D representation.

17. The system of claim 17, wherein the one or more feature encodings include a first texture feature vector corresponding to a first portion of the first object, a second texture feature vector corresponding to a second portion of the first object, and a shape code vector generated by an encoder network receiving at least the 3D representation of the first object as input.

18. The system of claim 17, wherein the one or more processors are further to:
provide the mapped coordinates in the 2D texture space as input to a first basis generator network, to generate a first texture basis, and a second basis generator network to generate a second texture basis.

19. The system of claim 18, wherein the one or more processors are further to:
generate a first texture image using point color data determined based in part on the first texture basis and the first texture feature vector; and
generate a second texture image using point cloud color data determined based in part on the second texture basis and the second texture feature vector.

20. The system of claim 16, wherein the system comprises at least one of:
a system for performing simulation operations;
a system for performing simulation operations to test or validate autonomous machine applications;
a system for performing digital twin operations;
a system for performing light transport simulation;
a system for rendering graphical output;
a system for performing deep learning operations;
a system implemented using an edge device;
a system for generating or presenting virtual reality (VR) content;
a system for generating or presenting augmented reality (AR) content;
a system for generating or presenting mixed reality (MR) content;
a system incorporating one or more Virtual Machines (VMs);
a system implemented at least partially in a data center;
a system for performing hardware testing using simulation;
a system for synthetic data generation;
a collaborative content creation platform for 3D assets; or
a system implemented at least partially using cloud computing resources.

Other variations are within spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. Term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. Use of term "set" (e.g., "a set of items") or "subset," unless otherwise noted or contradicted by context, is to be construed as a nonempty collection comprising one or more members. Further, unless otherwise noted or contradicted by context, term "subset" of a corresponding set does not necessarily denote a proper subset of corresponding set, but subset and corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: {A}, {B}, {C}, {A, B}, {A, C}, {B, C}, {A, B, C}. Thus, such conjunctive language is not generally intended to imply that certain embodiments require at least one of A, at least one of B, and at least one of C each to be present. In addition, unless otherwise noted or contradicted by context, term "plurality" indicates a state of being plural (e.g., "a plurality of items" indicates multiple items). A plurality is at least two items, but can be more when so indicated either explicitly or by context. Further, unless stated otherwise or otherwise clear from context, phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. A set of non-transitory computer-readable storage media, in at least one embodiment, comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors— for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, term "processor" may refer to any device or portion of a device that processes electronic data from registers and/or memory and transform that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. Terms "system" and "method" are used herein interchangeably insofar as system may embody one or more methods and methods may be considered a system.

In present document, references may be made to obtaining, acquiring, receiving, or inputting analog or digital data into a subsystem, computer system, or computer-implemented machine. Obtaining, acquiring, receiving, or inputting analog and digital data can be accomplished in a variety of ways such as by receiving data as a parameter of a function call or a call to an application programming interface. In some implementations, process of obtaining, acquiring, receiving, or inputting analog or digital data can be accomplished by transferring data via a serial or parallel interface. In another implementation, process of obtaining, acquiring, receiving, or inputting analog or digital data can be accomplished by transferring data via a computer network from providing entity to acquiring entity. References may also be made to providing, outputting, transmitting, sending, or presenting analog or digital data. In various examples, process of providing, outputting, transmitting, sending, or presenting analog or digital data can be accomplished by transferring data as an input or output parameter of a function call, a parameter of an application programming interface or interprocess communication mechanism.

Although discussion above sets forth example implementations of described techniques, other architectures may be used to implement described functionality, and are intended to be within scope of this disclosure. Furthermore, although specific distributions of responsibilities are defined above for purposes of discussion, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A computer-implemented method, comprising:
   obtaining a three-dimensional (3D) representation of a first object;
   generating one or more feature encodings corresponding to the 3D representation;
   mapping coordinates of the 3D representation to a two-dimensional (2D) texture space;
   generating, based in part on the mapped coordinates in the 2D texture space, a first texture basis for a first portion of the first object and a second texture basis for a second portion of the first object;
   generating, based in part on the mapped coordinates in the 2D texture space, the first texture basis, the second texture basis, and the one or more feature encodings, a 2D texture image corresponding to the 3D representation of the first object; and
   deforming the 2D texture image to correspond to 3D geometry of a second object.

2. The computer-implemented method of claim 1, wherein the 3D representation of the first object is a point cloud comprising points with color data.

3. The computer-implemented method of claim 1, wherein the one or more feature encodings include a first texture feature vector corresponding to the first portion of the first object, a second texture feature vector corresponding to the second portion of the first object, and a shape code vector generated by an encoder network receiving at least the 3D representation of the first object as input.

4. The computer-implemented method of claim 3, further comprising:
   generating a first texture image using point color data determined based in part on the first texture basis and the first texture feature vector; and
   generating a second texture image using point cloud color data determined based in part on the second texture basis and the second texture feature vector.

5. The computer-implemented method of claim 4, further comprising:
   segmenting surface points of the 3D representation of the first object to generate a first mask, corresponding to the first portion of the first object, and a second mask corresponding to the second portion of the first object; and
   using the first mask and the second mask with the first texture image and the second texture image to generate a masked combination of color values for coordinates of the second object.

6. The computer-implemented method of claim 1, further comprising:
   providing the mapped coordinates in the 2D texture space as input to a first basis generator network, to generate the first texture basis, and to a second basis generator network to generate the second texture basis.

7. The computer-implemented method of claim 1, wherein the 3D representation of the first object is segmented into a plurality of voxels before the one or more feature encodings are generated by an encoding network.

8. The computer-implemented method of claim 1, wherein the second object is a different object from the first object, or the first object in a different pose or state.

9. The computer-implemented method of claim 1, wherein the one or more feature encodings corresponding to the first object include semantic information for the object.

10. A processor, comprising:
    one or more circuits to:
      obtain a three-dimensional (3D) representation of a first object;
      generate one or more feature encodings corresponding to the 3D representation;
      map coordinates of the 3D representation to a two-dimensional (2D) texture space;
      generate, based in part on the mapped coordinates in the 2D texture space, a first texture basis based on a first portion of the first object, and a second texture basis based on a second portion of the first object;
      generate, based in part on the mapped coordinates in the 2D texture space, the first texture basis, and the second texture basis, and the one or more feature encodings, a 2D texture image corresponding to the 3D representation of the first object; and
      deform the 2D texture image to correspond to 3D geometry of a second object.

11. The processor of claim 10, wherein the one or more feature encodings include a first texture feature vector corresponding to the first portion of the first object, a second texture feature vector corresponding to the second portion of the first object, and a shape code vector generated by an encoder network receiving at least the 3D representation of the first object as input.

12. The processor of claim 11, wherein the one or more circuits are to perform operations further to:
    generate a first texture image using point color data determined based in part on the first texture basis and the first texture feature vector; and
    generate a second texture image using point cloud color data determined based in part on the second texture basis and the second texture feature vector.

13. The processor of claim 12, wherein the one or more circuits are to perform operations further to:
  segment surface points of the 3D representation of the first object to generate a first mask, corresponding to the first portion of the first object, and a second mask corresponding to the second portion of the first object; and
  use the first mask and the second mask with the first texture image and the second texture image to generate a masked combination of color values for coordinates of the second object.

14. The processor of claim 10, wherein the one or more circuits are to perform operations further to:
  provide the mapped coordinates in the 2D texture space as input to a first basis generator network, to generate the first texture basis, and to a second basis generator network to generate the second texture basis.

15. The processor of claim 10, wherein the processor is comprised in at least one of:
  a system for performing simulation operations;
  a system for performing simulation operations to test or validate autonomous machine applications;
  a system for performing digital twin operations;
  a system for performing light transport simulation;
  a system for rendering graphical output;
  a system for performing deep learning operations;
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system implemented at least partially in a data center;
  a system for performing hardware testing using simulation;
  a system for synthetic data generation;
  a collaborative content creation platform for 3D assets; or
  a system implemented at least partially using cloud computing resources.

16. A system, comprising:
  one or more processors to use a neural network to deform at least one two-dimensional (2D) texture image of a first object to correspond to a three-dimensional (3D) geometry of a second object, the one or more processors further to generate the at least one 2D texture image based in part on mapped coordinates of a 3D representation of the first object in 2D texture space, a first texture basis for a first portion of the first object generated using the mapped coordinates of the 3D representation, a second texture basis for a second portion of the first object generated using the mapped coordinates of the 3D representation, and one or more feature encodings extracted from the 3D representation.

17. The system of claim 16, wherein the one or more feature encodings include a first texture feature vector corresponding to the first portion of the first object, a second texture feature vector corresponding to the second portion of the first object, and a shape code vector generated by an encoder network receiving at least the 3D representation of the first object as input.

18. The system of claim 17, wherein the one or more processors are further to:
  generate a first texture image using point color data determined based in part on the first texture basis and the first texture feature vector; and
  generate a second texture image using point cloud color data determined based in part on the second texture basis and the second texture feature vector.

19. The system of claim 16, wherein the one or more processors are further to:
  provide the mapped coordinates in the 2D texture space as input to a first basis generator network, to generate the first texture basis, and a second basis generator network to generate the second texture basis.

20. The system of claim 16, wherein the system comprises at least one of:
  a system for performing simulation operations;
  a system for performing simulation operations to test or validate autonomous machine applications;
  a system for performing digital twin operations;
  a system for performing light transport simulation;
  a system for rendering graphical output;
  a system for performing deep learning operations;
  a system implemented using an edge device;
  a system for generating or presenting virtual reality (VR) content;
  a system for generating or presenting augmented reality (AR) content;
  a system for generating or presenting mixed reality (MR) content;
  a system incorporating one or more Virtual Machines (VMs);
  a system implemented at least partially in a data center;
  a system for performing hardware testing using simulation;
  a system for synthetic data generation;
  a collaborative content creation platform for 3D assets; or
  a system implemented at least partially using cloud computing resources.

* * * * *